(12) United States Patent
Hunstable

(10) Patent No.: US 11,165,307 B2
(45) Date of Patent: Nov. 2, 2021

(54) MAGNETIC MOTOR AND METHOD OF USE

(71) Applicant: Linear Labs, LLC, Granbury, TX (US)

(72) Inventor: Fred E. Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 0 days.

(21) Appl. No.: 16/410,986

(22) Filed: May 13, 2019

(65) Prior Publication Data

US 2019/0267867 A1 Aug. 29, 2019

Related U.S. Application Data

(63) Continuation of application No. 15/089,545, filed on Apr. 2, 2016, now Pat. No. 10,291,096, which is a continuation of application No. 14/554,023, filed on Nov. 25, 2014, now Pat. No. 9,325,219, which is a continuation of application No. 13/279,079, filed on Oct. 21, 2011, now Pat. No. 8,922,070.

(60) Provisional application No. 61/406,031, filed on Oct. 22, 2010.

(51) Int. Cl.
*H02K 7/075* (2006.01)
*H02K 35/04* (2006.01)

(52) U.S. Cl.
CPC ............. *H02K 7/075* (2013.01); *H02K 35/04* (2013.01)

(58) Field of Classification Search
CPC ............................... H02K 35/04; H02K 7/075
USPC .......................................................... 310/24
See application file for complete search history.

(56) References Cited

U.S. PATENT DOCUMENTS

| | | | | |
|---|---|---|---|---|
| 1,349,100 A | * | 8/1920 | Reynolds | H02K 7/065 310/24 |
| 3,135,880 A | * | 6/1964 | Olson | H02K 41/033 310/14 |
| 3,656,015 A | * | 4/1972 | Gillum | H02K 41/0356 310/13 |
| 3,666,977 A | * | 5/1972 | Helms | G11B 5/5521 310/13 |
| 3,740,594 A | * | 6/1973 | Casey | H01F 7/13 310/30 |

(Continued)

FOREIGN PATENT DOCUMENTS

| AU | 2011316872 B2 | 11/2016 |
|---|---|---|
| CA | 2814530 C | 9/2019 |

(Continued)

OTHER PUBLICATIONS

Australian Exam Report No. 1, dated Jul. 27, 2015, re AU Patent App No. 2011316872.

(Continued)

*Primary Examiner* — Alex W Mok
(74) *Attorney, Agent, or Firm* — Bill R. Naifeh

(57) ABSTRACT

Embodiments of the present invention may include a method of producing mechanical power by moving a coil coupled to a shaft partially into a magnetic cylinder having a magnetic end cap containing a plurality of stacked magnetic forces, changing the magnetic polarity of the shaft, moving the coil out of the magnetic cylinder. In other embodiments, there is an electric motor apparatus comprising a magnetic cylinder, a coil coupled to a shaft, and a means for reversing the magnetic polarity of the shaft.

20 Claims, 14 Drawing Sheets

(56) References Cited

U.S. PATENT DOCUMENTS

| | | | | |
|---|---|---|---|---|
| 3,751,693 A * | 8/1973 | Gabor | H02K 41/0356 | 310/13 |
| 3,939,367 A * | 2/1976 | Ramirez | H02K 7/065 | 310/20 |
| 3,949,249 A * | 4/1976 | Wiseley | H02K 7/065 | 310/17 |
| 3,984,706 A * | 10/1976 | Inouye | G11B 5/5521 | 310/12.08 |
| 4,217,507 A * | 8/1980 | Jaffe | D05B 69/10 | 310/12.07 |
| 4,243,899 A * | 1/1981 | Jaffe | H02K 41/033 | 310/14 |
| 4,317,058 A * | 2/1982 | Blalock | H02K 7/065 | 310/24 |
| 4,318,038 A * | 3/1982 | Munehiro | H02K 41/031 | 310/13 |
| 4,415,821 A * | 11/1983 | Wedman | G11B 21/08 | 310/12.19 |
| 4,445,798 A * | 5/1984 | Munehiro | B41J 19/305 | 310/12.04 |
| 4,518,882 A * | 5/1985 | Morino | H02K 41/031 | 310/12.21 |
| 4,555,797 A | 11/1985 | Nieuwendijk | | |
| 4,785,210 A * | 11/1988 | Maruyama | G03B 3/10 | 310/12.01 |
| 4,845,392 A * | 7/1989 | Mumbower | H01F 7/13 | 310/14 |
| 4,858,452 A * | 8/1989 | Ibrahim | E05B 47/00 | 70/275 |
| 5,099,158 A * | 3/1992 | Stuart | B60G 17/0157 | 310/14 |
| 5,177,383 A * | 1/1993 | Sim | H02K 41/0356 | 310/13 |
| 5,220,223 A * | 6/1993 | Mehnert | H02K 21/38 | 310/14 |
| 5,231,336 A * | 7/1993 | van Namen | F16F 7/1011 | 318/128 |
| 5,245,238 A | 9/1993 | Lynch | | |
| 5,434,458 A * | 7/1995 | Stuart | H04R 9/045 | 310/13 |
| 5,440,183 A * | 8/1995 | Denne | F15B 15/00 | 310/12.26 |
| 5,539,262 A * | 7/1996 | Strugach | H02K 41/0356 | 310/13 |
| 5,631,505 A * | 5/1997 | Stephany | H02K 41/0356 | 310/12.24 |
| 5,757,093 A * | 5/1998 | Susliaev | H02K 7/075 | 310/24 |
| 5,777,403 A * | 7/1998 | Yuan | H02K 41/0356 | 310/12.16 |
| 5,808,379 A * | 9/1998 | Zhao | H02K 41/0356 | 310/12.05 |
| 5,818,131 A * | 10/1998 | Zhang | F04D 29/049 | 310/15 |
| 5,821,710 A | 10/1998 | Masuzawa | | |
| 5,825,113 A | 10/1998 | Lipo | | |
| 6,049,146 A * | 4/2000 | Takara | F03G 7/00 | 310/24 |
| 6,066,998 A * | 5/2000 | Trumper | H01F 7/066 | 310/13 |
| 6,075,297 A * | 6/2000 | Izawa | H02K 41/03 | 310/12.21 |
| 6,097,125 A * | 8/2000 | Park | H02K 1/34 | 310/12.16 |
| 6,163,091 A * | 12/2000 | Wasson | H02K 41/03 | 310/12.19 |
| 6,242,823 B1 * | 6/2001 | Griswold | H02K 41/0356 | 310/12.12 |
| 6,278,204 B1 * | 8/2001 | Frenette | H02K 7/075 | 310/24 |
| 6,365,993 B1 * | 4/2002 | Calhoon | H02K 33/02 | 310/12.25 |
| 6,462,430 B1 | 10/2002 | Joong | | |
| 6,952,060 B2 * | 10/2005 | Goldner | B60G 17/0157 | 310/12.13 |
| 7,078,833 B2 * | 7/2006 | Xu | H01F 7/14 | 310/12.33 |
| 7,276,820 B2 * | 10/2007 | Tang | H02K 1/34 | 310/12.02 |
| 7,288,862 B2 * | 10/2007 | Song | H02K 33/16 | 310/12.24 |
| 7,439,640 B2 * | 10/2008 | Takeuchi | H01F 7/066 | 310/12.22 |
| 7,476,991 B2 * | 1/2009 | Chang | H02K 7/06 | 180/65.1 |
| 7,501,724 B2 * | 3/2009 | Tang | H02K 1/34 | 310/12.19 |
| 7,528,561 B2 * | 5/2009 | Kawai | F16C 29/00 | 310/13 |
| 7,554,241 B2 | 6/2009 | Rao | | |
| 7,579,722 B1 * | 8/2009 | Borchert | H02K 7/075 | 310/15 |
| 8,074,579 B1 | 12/2011 | Bojiuc | | |
| 8,110,950 B2 * | 2/2012 | Moriyama | H02K 41/03 | 310/12.31 |
| 8,441,158 B2 | 5/2013 | Vollmer | | |
| 8,816,554 B2 | 8/2014 | Li | | |
| 8,922,070 B2 * | 12/2014 | Hunstable | H02K 7/075 | 310/24 |
| 9,219,962 B2 * | 12/2015 | Hunstable | H04R 9/02 | |
| 9,312,058 B2 | 4/2016 | Michaelsen et al. | | |
| 9,325,219 B2 * | 4/2016 | Hunstable | H02K 7/075 | |
| 9,325,232 B1 * | 4/2016 | Hunstable | H02K 35/04 | |
| 9,876,407 B2 | 1/2018 | Walsh | | |
| 9,936,300 B2 | 4/2018 | Hunstable | | |
| 9,947,448 B2 | 4/2018 | Kohlhafer | | |
| 10,125,814 B2 | 11/2018 | Walsh | | |
| 10,263,480 B2 | 4/2019 | Hunstable | | |
| 10,291,096 B2 | 5/2019 | Hunstable | | |
| 10,326,343 B2 | 6/2019 | Walsh | | |
| 10,340,768 B2 | 7/2019 | Walsh | | |
| 10,575,100 B2 | 2/2020 | Hunstable | | |
| 10,587,178 B2 | 3/2020 | Hunstable | | |
| 2001/0007400 A1 * | 7/2001 | Griswold | H02K 41/0356 | 310/14 |
| 2003/0102723 A1 * | 6/2003 | Korenaga | G03F 7/70758 | 310/12.24 |
| 2004/0155536 A1 * | 8/2004 | Cordiale | F04B 17/046 | 310/24 |
| 2004/0194286 A1 | 10/2004 | Rose | | |
| 2004/0239199 A1 * | 12/2004 | Qu | H02K 21/16 | 310/114 |
| 2004/0245861 A1 * | 12/2004 | Miyajima | H02K 41/03 | 310/12.06 |
| 2005/0046282 A1 * | 3/2005 | Tang | H02K 1/34 | 310/12.02 |
| 2005/0285467 A1 | 12/2005 | Shimizu | | |
| 2006/0055251 A1 * | 3/2006 | Hsian | H02K 33/16 | 310/12.22 |
| 2006/0261680 A1 * | 11/2006 | Moon | H02K 33/18 | 310/14 |
| 2008/0088195 A1 | 4/2008 | Dooley | | |
| 2008/0308199 A1 * | 12/2008 | Locker | B23P 9/04 | 148/649 |
| 2009/0102305 A1 | 4/2009 | Lu | | |
| 2009/0251021 A1 | 10/2009 | Atarashi | | |
| 2009/0261675 A1 | 10/2009 | Hsiao | | |
| 2010/0001592 A1 * | 1/2010 | Kawano | H02K 49/10 | 310/12.14 |
| 2010/0164422 A1 | 7/2010 | Shu | | |
| 2011/0273789 A1 | 11/2011 | Knoedgen | | |
| 2012/0098357 A1 * | 4/2012 | Hunstable | H02K 35/04 | 310/20 |
| 2012/0286616 A1 | 11/2012 | Li | | |
| 2013/0026279 A1 * | 1/2013 | Agrikli | B65H 54/2833 | 242/476.7 |
| 2013/0249343 A1 | 9/2013 | Hunstable | | |
| 2014/0191612 A1 | 7/2014 | Mariotto | | |
| 2015/0137647 A1 | 5/2015 | Hunstable | | |

(56) References Cited

U.S. PATENT DOCUMENTS

| | | |
|---|---|---|
| 2015/0171694 A1 | 6/2015 | Walsh |
| 2016/0020652 A1 | 1/2016 | Hunstable |
| 2016/0112805 A1* | 4/2016 | Hunstable ............ H04R 9/025 381/401 |
| 2017/0025923 A1 | 1/2017 | Hunstable |
| 2017/0025939 A1* | 1/2017 | Hunstable ............ H02K 35/04 |
| 2019/0103793 A1 | 4/2019 | Walsh |
| 2019/0312497 A1 | 10/2019 | Walsh |
| 2020/0274433 A1 | 8/2020 | Hunstable |
| 2020/0275211 A1 | 8/2020 | Hunstable |
| 2021/0044191 A1 | 2/2021 | Hunstable |

FOREIGN PATENT DOCUMENTS

| | | | |
|---|---|---|---|
| CN | 201206539 Y | 3/2009 | |
| CN | 102792569 A | 11/2012 | |
| CN | 103250330 B | 9/2016 | |
| DE | 19839464 A1 * | 3/2000 | ............ H02K 33/18 |
| DE | 202007001534 U1 | 4/2007 | |
| DE | 102010024344 A1 | 12/2011 | |
| EP | 0566959 A1 | 10/1993 | |
| EP | 1191673 A2 | 3/2002 | |
| EP | 2346149 A1 | 7/2011 | |
| EP | 2630721 B1 | 6/2018 | |
| GB | 2286928 A | 8/1995 | |
| JP | 58204761 A * | 11/1983 | ............ H02K 41/031 |
| JP | 09018992 A * | 1/1997 | |
| JP | 2000152558 A * | 5/2000 | |
| JP | 2002369473 A | 12/2002 | |
| JP | 2010166741 A | 7/2010 | |
| KR | 100770590 B1 * | 10/2007 | |
| RU | 140346 U1 | 1/2014 | |
| WO | 0046910 A1 | 8/2000 | |
| WO | 2008/006906 A1 | 1/2008 | |
| WO | 2017008085 A1 | 1/2017 | |

OTHER PUBLICATIONS

Australian Exam Report No. 2, dated Apr. 11, 2016, re AU Patent App No. 2011316872.

Australian Notice of Acceptance, dated Jul. 26, 2016, re Patent App No. 2011316872.

Chinese Office Action, dated Mar. 4, 2015, re CN App No. 201180058326.4, 18 pages.

Chinese Second Office Action, dated Oct. 28, 2015, re CN Patent App No. 201180058326.4.

Chinese Third Office Action, dated Mar. 15, 2016, re Patent App No. 801180058326.4.

European Office Action, dated Feb. 2, 2015, re EP Patent App No. 11776307.8.

European Office Action, dated Jun. 16, 2014, re EP Patent App No. 11776307.8.

European Office Action, dated Sep. 18, 2015, re EP App No. 11776307.8.

International Search Report and Written Opinion, dated Jan. 17, 2014, re PCT/US2013/057888.

International Search Report and Written Opinion, dated Jan. 25, 2012, re PCT/US2011/057318.

International Search Report and Written Opinion, dated Nov. 3, 2016, by the ISA/RU, re PCT/US2016/041818.

Mexico Office Action, dated Mar. 5, 2014, re MX Patent Application No. MX/a/2013/004439.

Canadian Office Action, dated Sep. 7, 2017, by the CIPO, re GA Patent App No. 2,814,530.

Canadian Office Action, dated Jun. 4, 2018, by the CIPO, re GA Patent App No. 2,814,530.

Brazil Office Action, dated Apr. 20, 2020, re BR App No. BR112013009476.

Office Action, dated Jun. 26, 2020, by the USPTO, re U.S. Appl. No. 16/810,920.

Final Office Action, dated Oct. 27, 2020, by the USPTO, re U.S. Appl. No. 16/810,920.

BR Office Action, dated Nov. 17, 2020, by the BIPO, re BR App No. BR112013009476.

Notice of Allowance, dated Jan. 26, 2021, by the USPTO, re U.S. Appl. No. 16/810,920.

Zhao et al.; Energy Harvesting from Vehicle Suspension System by Peizoelectric Harvester; Mathematical Problems in Engineering; vol. 2019, Article ID 1086983, Aug. 15, 2019.

Notice of Allowance, dated May 12, 2021, by the USPTO, re U.S. Appl. No. 16/810,920.

* cited by examiner

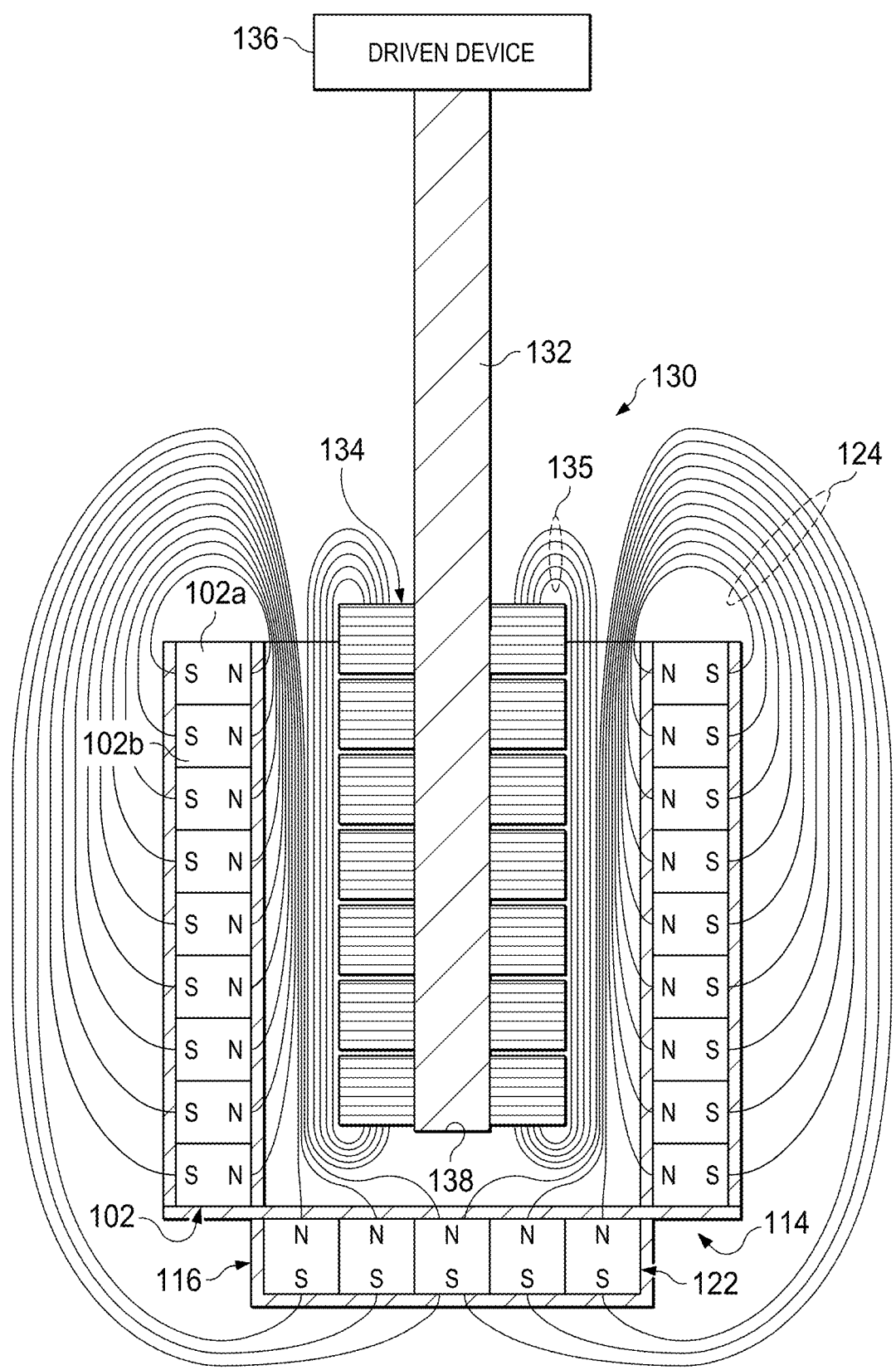

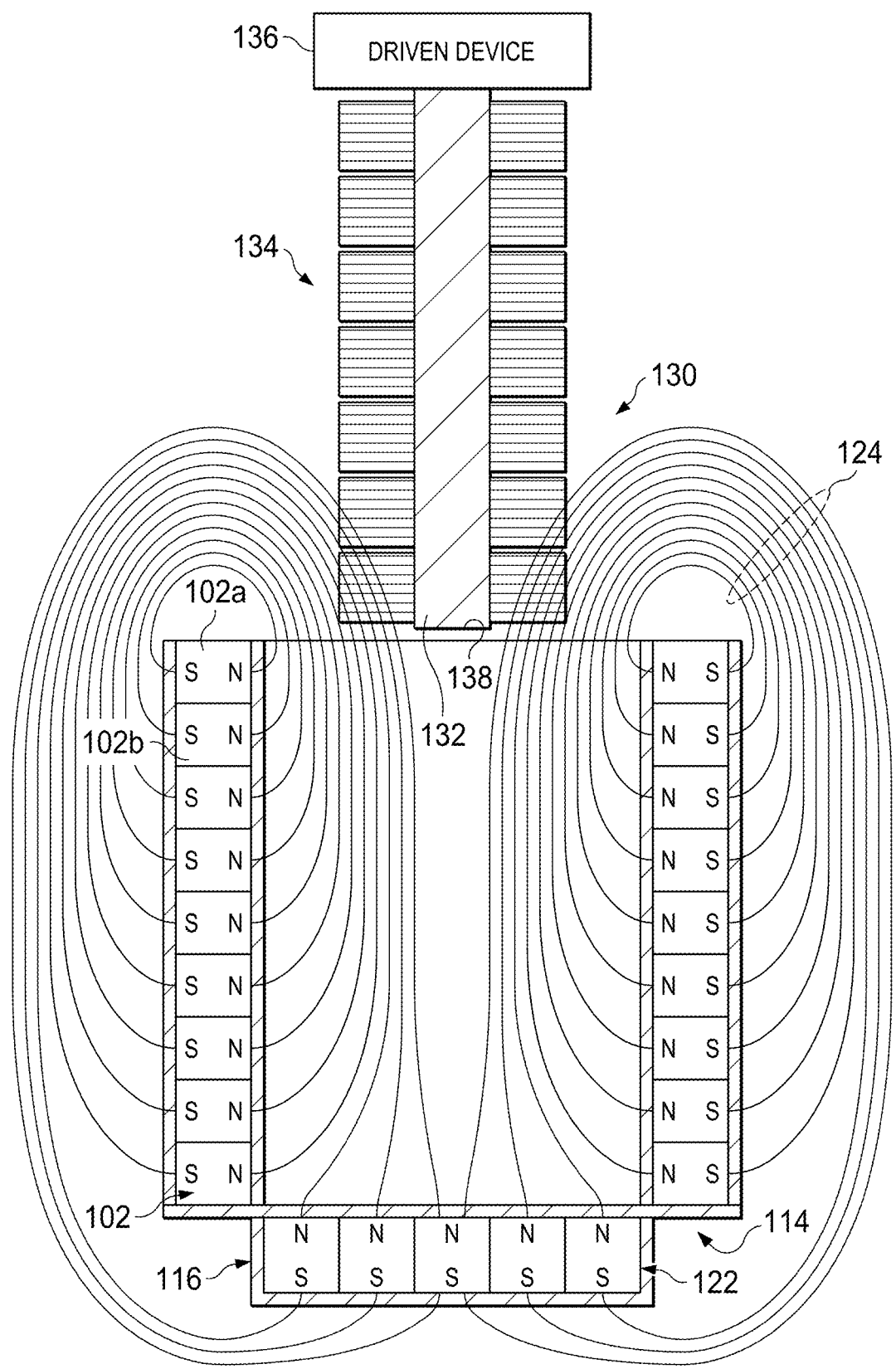

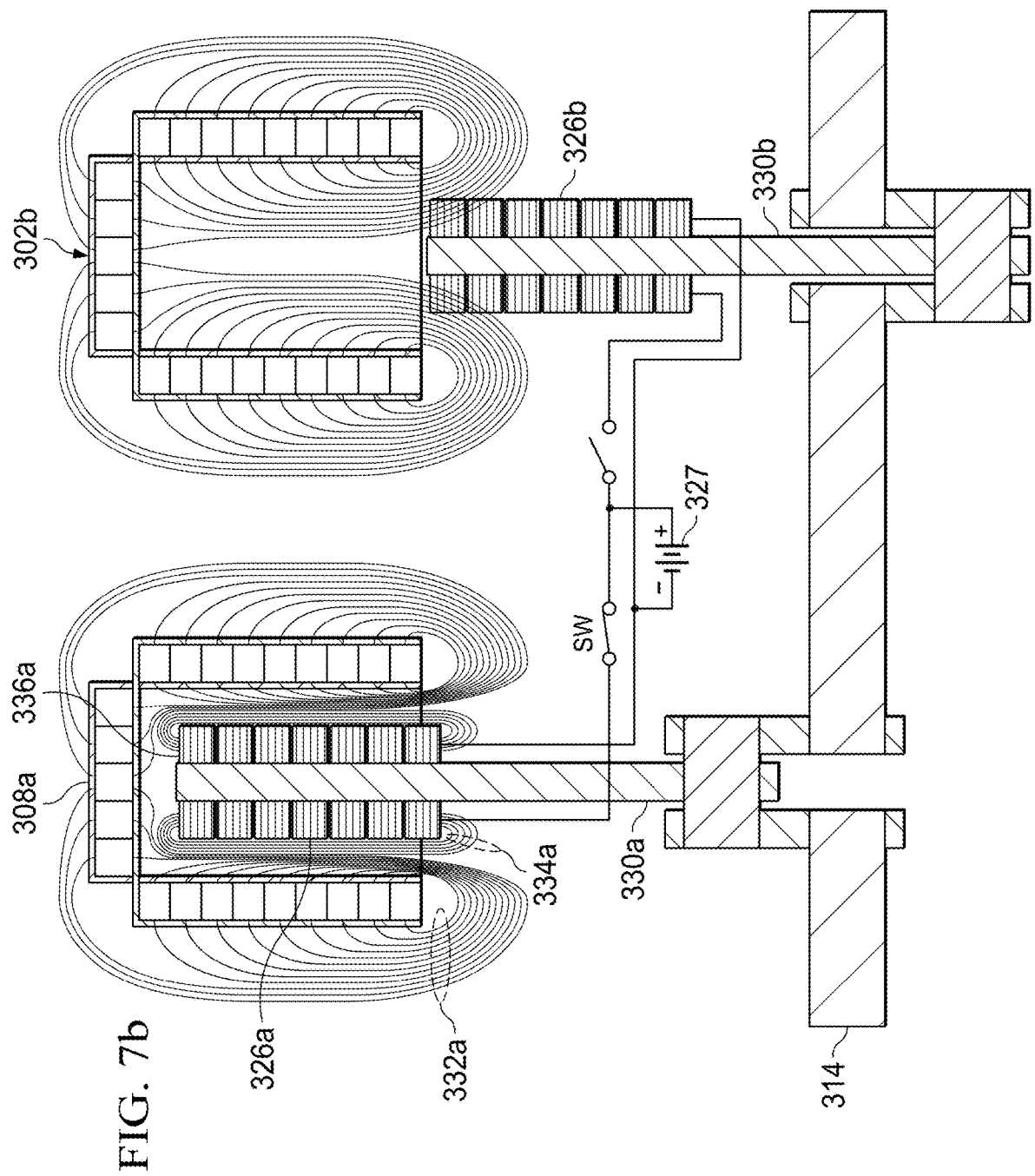

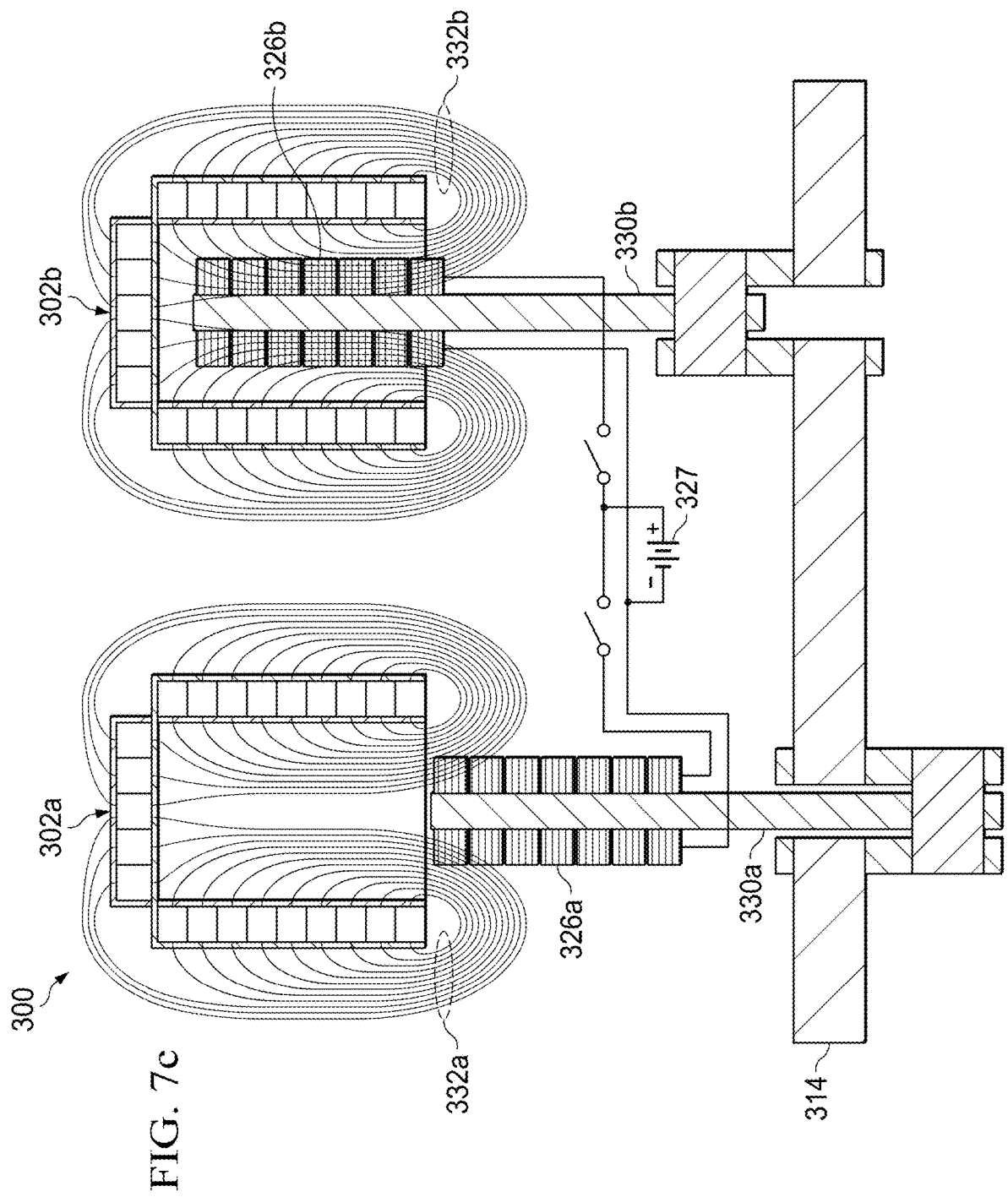

MAGNETIC MOTOR AND METHOD OF USE

CROSS REFERENCE TO RELATED APPLICATIONS

This application is a continuation of U.S. application Ser. No. 15/089,545 filed Apr. 2, 2016, which is a continuation of U.S. application Ser. No. 14/554,023 filed Nov. 25, 2014, which is a continuation of U.S. application Ser. No. 13/279,079 filed Oct. 21, 2011, which claims the benefit of U.S. Provisional Application No. 61/406,031 filed on Oct. 22, 2010, the disclosures of which are all incorporated herein by reference for all purposes.

TECHNICAL FIELD

The invention relates in general to a new and improved electric motor and in particular to an improved system and method for producing motion from an electro-magnetic motor.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821.

In a traditional electric motor, a central core of tightly wrapped current carrying material (known as the rotor) spins or rotates at high speed between the fixed poles of a magnet (known as the stator) when an electric current is applied. The central core is typically coupled to a shaft which will also rotate with the rotor. The shaft may be used to drive gears and wheels in a rotary machine and/or convert rotational motion into motion in a straight line.

A linear motor may be visualized as a typical electric motor that has been cut open and unwrapped. The "stator" is laid out in the form of a track of flat coils made from aluminum or copper and is known as the "primary" of a linear motor. The "rotor" takes the form of a moving platform known as the "secondary." When the current is switched on, the secondary glides past the primary supported and propelled by a magnetic field.

Although electric motors have been used for over 150 years, as the world's energy resources grow more scarce, there is a need for more efficient methods and improvements in electrical motors.

SUMMARY

In response to these and other problems, there is presented various embodiments disclosed in this application, including a method of producing mechanical power by moving a coil coupled to a shaft partially into a magnetic cylinder having a magnetic end cap, changing the magnetic polarity of the shaft, and moving the coil out of the magnetic cylinder. In other embodiments, there is an electric motor apparatus comprising a magnetic cylinder, a coil coupled to a shaft, and a means for reversing the magnetic polarity of the shaft. These and other features, and advantages, will be more clearly understood from the following detailed description taken in conjunction with the accompanying drawings. It is important to note the drawings are not intended to represent the only aspect of the invention.

BRIEF DESCRIPTION OF THE DRAWINGS

FIG. 4c is a conceptualized section view of a magnetic motor assembly at the bottom of a stroke after coils have been energized.
FIG. 4d is a conceptualized section view of a magnetic motor assembly at the top of a stroke.
FIG. 5b is a section view of the single cylinder engine of FIG. 5a.
FIG. 6b is a section view of the dual cylinder engine of FIG. 6a.
FIGS. 7a through 7d are conceptualized section views of the two cylinder engine of FIGS. 6a and 6b showing the cylinders rotating through their respective strokes.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry, power supplies, or circuitry used to power certain components or elements described herein are omitted, as such details are within the skills of persons of ordinary skill in the relevant art.

When directions, such as upper, lower, top, bottom, clockwise, counter-clockwise, are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Figure 1:
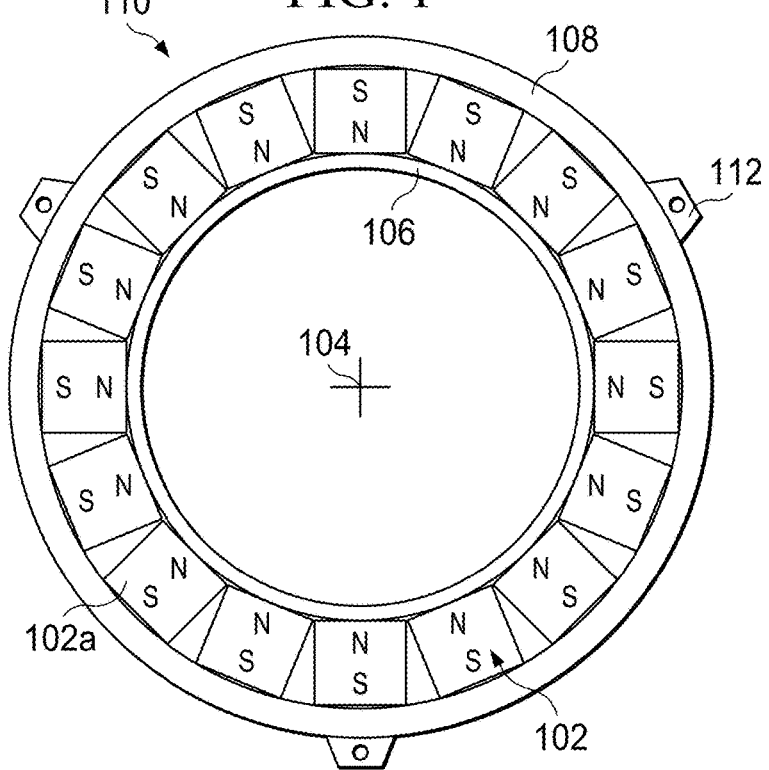
FIG. 1 is a top view of a magnetic disc.

Turning now to FIG. 1, there is presented a top view of one embodiment of a magnetic disc 110 which may be used by various embodiments of the present invention. In the illustrated embodiment, there is a plurality of permanent magnets 102 or permanent magnetic devices radially arranged about the center axis of the disc or a longitudinal axis 104.

In the illustrative embodiment, the plurality of magnets 102 are positioned between an interior ring 106 and an exterior retaining ring 108. The retaining ring 108 is structurally sufficient to overcome the magnetic repulsive forces of the magnetic devices and maintain the radial arrangement of the magnets 102. The retaining ring 108 may be formed from a variety of materials. In the illustrative embodiment, the retaining ring 108 is formed from iron or a relatively soft iron alloy. In other embodiments, they may be formed from non-ferrous metal if structural strength is the primary consideration for the use of the retaining ring.

In this example, the interior ring 106 is also concentrically positioned about the longitudinal axis 104. The interior ring 106 may be formed from iron and may be added to strengthen the magnetic flux strength of the system or for additional structural stability. In certain embodiments the interior ring 106 may be formed from non-ferrous metal if structural strength is the primary consideration for the use of the inner retaining ring.

In the illustrated embodiment, each individual magnet of the plurality of magnets 102, for instance magnet 102a, is orientated such that one of its magnetic poles faces inward towards the longitudinal or center axis 104 of the magnetic disc 110. Consequently, the opposing pole faces outward from the center of the magnetic disc 110. By way of example, the magnets 102 each have their north poles facing inward and their south poles facing outward. Thus, the magnets 102 have their similar magnetic poles pointing towards the longitudinal axis 104. In other embodiments, the magnets 102 may have their similar magnetic poles (i.e., their south poles) facing towards the longitudinal axis 104.

In certain embodiments, the magnets 102 may be made of out any suitable magnetic material, such as: neodymium, Alnico alloys, ceramic permanent magnets, or even electromagnets. In certain embodiments, each magnet 102a in the plurality of magnets 102 has the dimensions of 1"×1"×2." The exact number of magnets or electromagnets will be dependent on the required magnetic field strength or mechanical configuration. The illustrated embodiment is only one way of arranging the magnets, based on certain commercially available magnets. Other arrangements are possible—especially if magnets are manufactured for this specific purpose.

The individual magnets 102a are held in place by an appropriate securing method known in the art, such as casting the magnets in resin, epoxying the magnets to a substrate, or by securing the magnets with mechanical fasteners.

Figure 2:
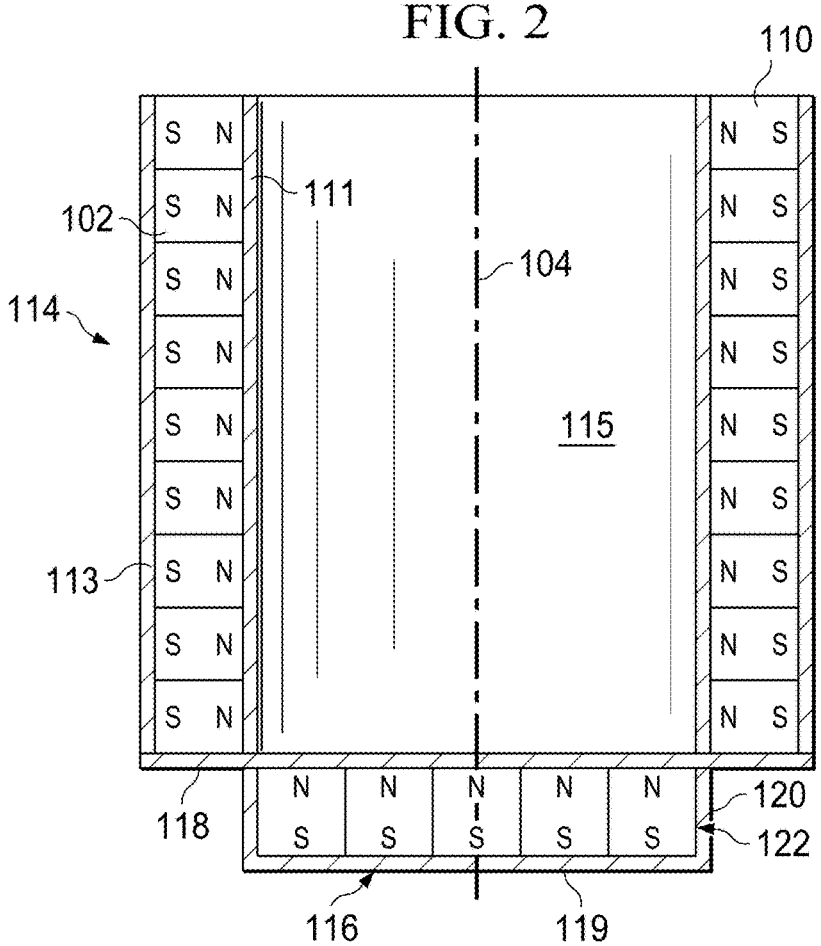
FIG. 2 is a schematic section view of a magnetic cylinder.

In certain embodiments, fastening features 112, such as screw holes, threaded studs, or interlocking rings are formed on the exterior of the outer retaining ring 108 to allow the magnetic disc 110 to be fastened to other magnetic discs or a support structure (not shown). For instance, turning to FIG. 2, there is shown a plurality of nine modular magnetic discs 110 coupled together to form a magnetic cylinder 114. Although nine magnetic discs 110 are illustrated, depending on the required magnetic flux field strength of the magnetic cylinder 114 or the desired stroke length (described below), any number of magnetic discs could be used to assemble the magnetic cylinder 114.

Because of the modular concept of the magnetic disc 110, in certain embodiments any number of magnetic discs 110 may be used to create a magnetic cylinder 114 of a desired length and/or power.

In other embodiments, the magnetic cylinder 114 may comprise a single inner confinement ring 111, a single outer confinement ring 113, and predetermined number of rows of the plurality of magnets 102 positioned in a radial manner.

In the illustrative embodiment, the magnetic cylinder 114 is concentrically centered about the longitudinal axis 104. In certain embodiments, the magnetic cylinder 114 includes a magnetic end cap 116 coupled to one end of the magnetic cylinder 114 to create a closed cylinder end. In some embodiments, the magnetic end cap 116 comprises an end plate 118, an end cap plate 119, a cap structure such as a circular retaining ring 120, and a plurality of end magnets 122. In other embodiments, the magnets 122 may extend into the interior space 115 of the magnetic cylinder 114. For instance, in certain embodiments, one third of the length of the magnets 122 may extend into the interior space 115 of the magnetic cylinder 114. The magnets 122 are each orientated such that their similar poles each face towards the interior of the cylinder 114. For instance, in this example, each of the magnets of the plurality of magnets have their north poles facing inward—corresponding to the north magnetic poles of the magnets 102 which also face inwards towards the longitudinal axis 114. Thus, the similar poles (e.g., north poles) of each individual magnet in the plurality of magnets 102 and magnets 122 each face inward with respect to the cylinder 114.

In certain embodiments, the plurality of end magnets 122 may be made from material similar to the magnets 102 of the disc 110. In certain embodiments, the end magnets 122 may be secured in a housing (i.e., the end plate 118, the end cap plate 119, and the circular retaining ring 120) and positioned such that their poles are parallel to the longitudinal axis 104. The end magnets 122 may also be arranged in a radial manner to form a concentric ring of end magnets. In certain embodiments, the end plate 118, the end cap plate 119, and circular retaining ring 120 may be made from the same material as the inner ring 106 or the outer ring 108 as discussed above.

Figure 3:
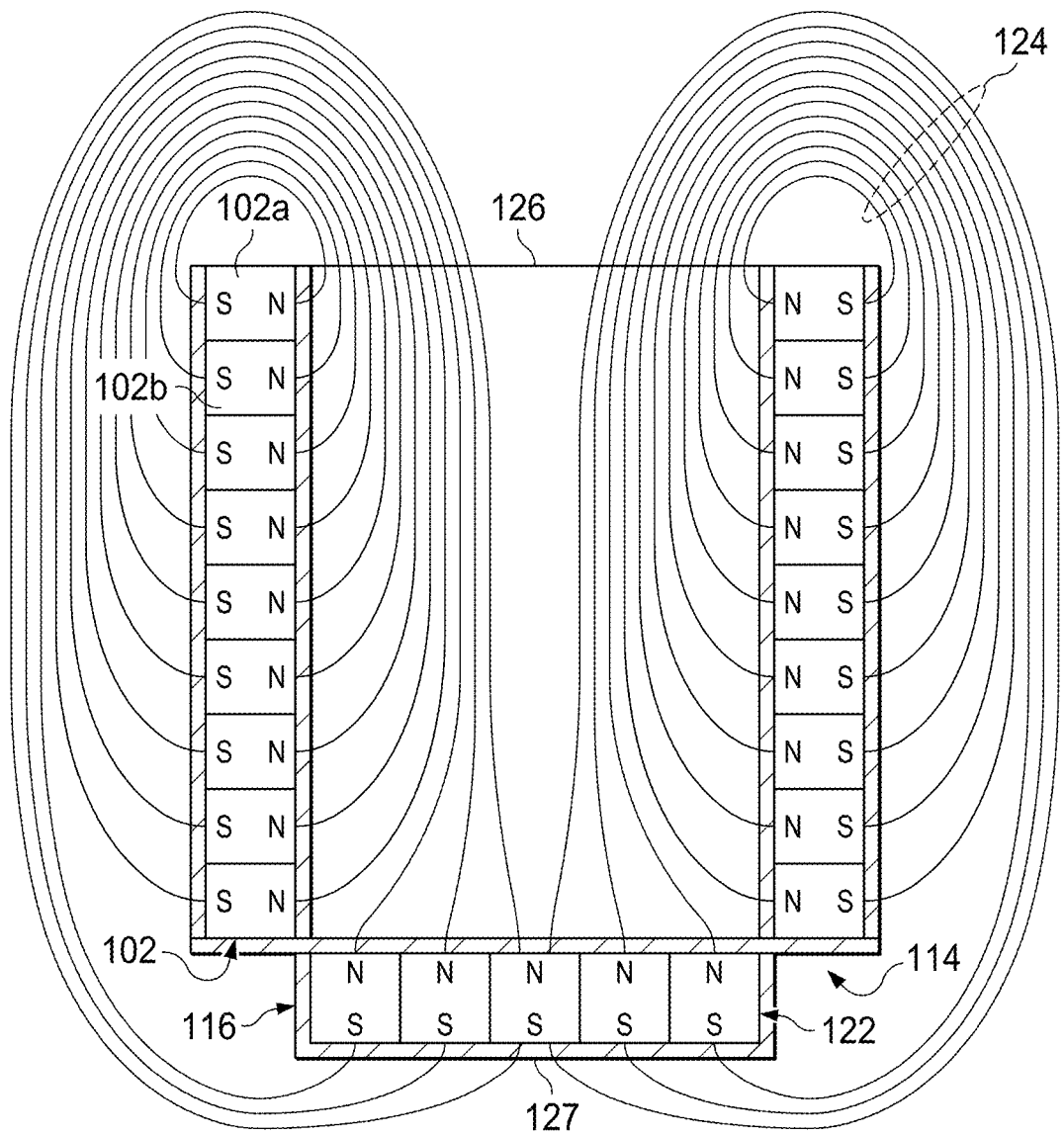
FIG. 3 is a schematic section view of a magnetic cylinder.

The permanent magnets 102 and end magnets 122 generate magnetic flux forces which can be represented in this application as magnetic flux forces. A simplified representation of the flux lines (or forces) 124 is illustrated in FIG. 3. When the permanent magnets 102 are arranged into a circular cylinder with an end cap of the magnets 122, the flux lines or forces will form particular patterns as represented in a conceptual manner by the flux lines 124 of FIG. 3. The actual shape, direction, and orientation of the flux forces 124 depend on factors such as the use of an interior retaining ring, or the use of ferrous or non ferrous metallic end plate, or an end plate consisting of magnetic assemblies oriented to force the lines of flux out of one end of the magnetic cylinder.

In conventional configurations, the opposing poles of the magnets are usually aligned longitudinally. Thus, the field flux forces will "hug" or closely follow the surface of the magnets. So, when using conventional electric motive equipment, the clearances must usually be extremely tight in order to be able to act on these lines of force. By aligning the magnetic poles of each radially towards the center of the cylinder, the magnetic flux forces tend to stack up (or are "stacked") as they pass through the center of the magnetic cylinder 114 and radiate perpendicularly from the surface of the magnets. This configuration allows for greater tolerances between the coils (not shown) and the magnetic cylinder 114.

Thus, in this illustrative embodiments, the magnetic flux lines (or forces) 124 will tend to develop a stacking effect and the use of the magnetic end cap 116 manipulates the flux lines or forces 124 of the magnets in the magnetic cylinder 114 such that most or all of the flux lines or forces 124 flows out of the open end 126 of the cylinder. For instance, the magnetic flux forces or lines generated by the magnet 102a tends to exit its interior face (or its north pole), circle around the open end 126 of the cylinder 114 and return to the south pole or exterior face of the magnet 102a. Similarly, the magnetic flux lines or forces generated by the magnet 102b tends to exit its interior face (or its north pole), circle around the top end (or open end) of the cylinder 114 and return to the south pole or exterior face of the magnet 102b. The magnetic flux forces tend to follow this pattern for each successive disc in the plurality of magnets 102 until the end of magnetic cylinder 114 is reached.

The flux lines or forces of the magnets 122 of the magnetic end cap 116 will also flow out the open end 126 and back around a closed end 127 of cylinder 114. Thus, the flux forces produced by the magnets of the cylinder 114 have an unobstructed path to exit through the interior of the cylinder and return to its opposing pole on the exterior of the cylinder.

Figure 4A:
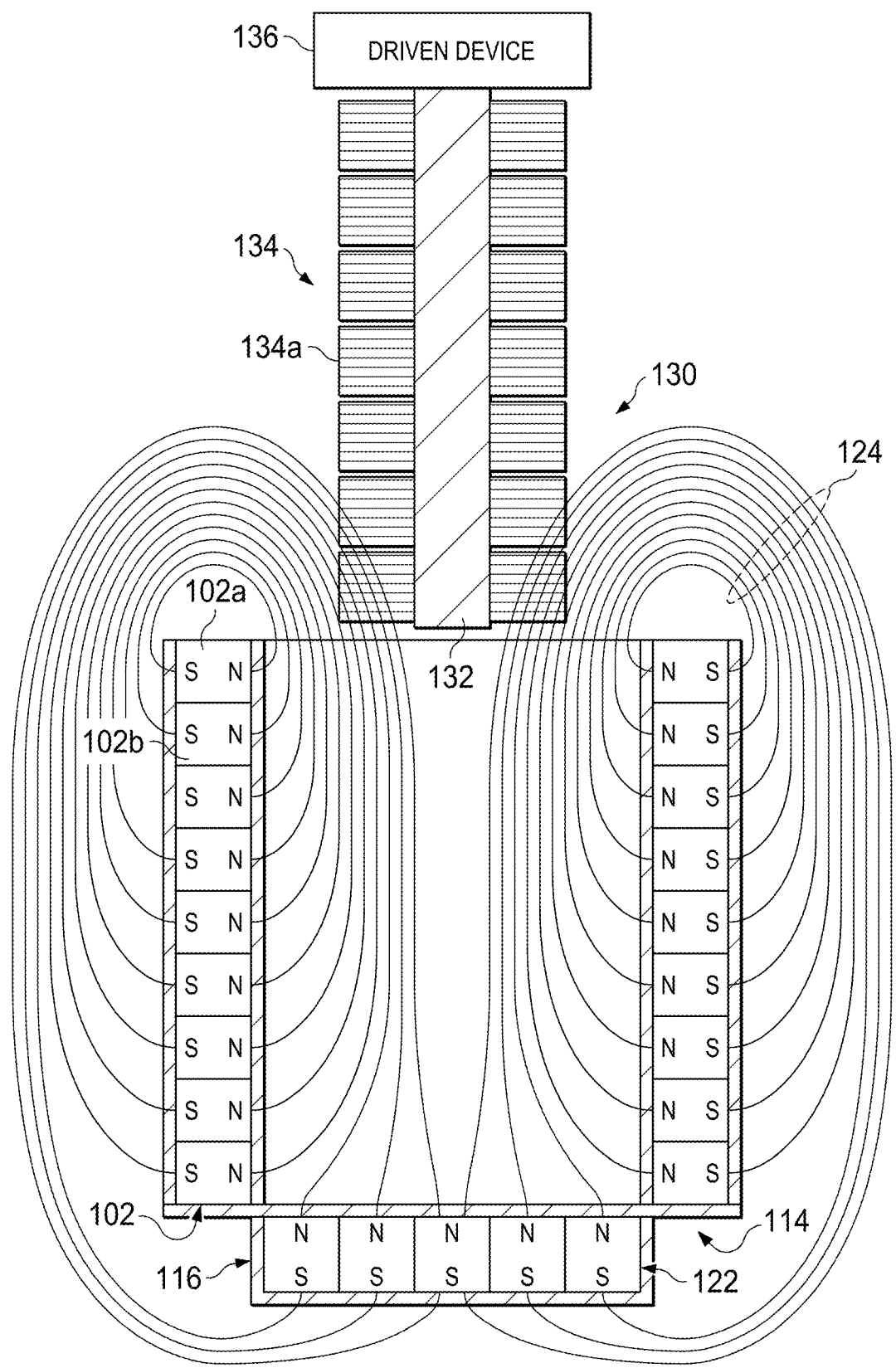
FIG. 4a is a conceptualized section view of a magnetic motor assembly at the top of a stroke.

FIG. 4a illustrates a conceptualized representation of an electric motor assembly 130 according to certain aspects of the present invention. As discussed previously, there is the magnetic cylinder 114 and a moveable shaft or core 132. In certain embodiments, the shaft 132 is elongated and rod-like in shape. The shaft 132, or a portion thereof, may be made from iron or a ferrite compound with similar magnetic properties. In some embodiments, the iron core (or portion thereof) may be 1½" in diameter. In certain embodiments, the core may be a ferrite compound or powder. In some embodiments, the ferrite compound or powder may be suspended in a viscous material, such as an insulating liquid, a lubricant, motor oil, gel, or mineral oil to reduce or eliminate eddy currents and magnetic hysteresis (especially at higher stroke speeds).

In certain embodiments, there may be a plurality of yolks coupled to a ring (not shown) through which the shaft 132 may slide through. The yolks provide structural support for the shaft 132 and/or the magnetic cylinder 114. In other embodiments, there may be a casing (not shown) which provides structural support for the magnetic cylinder 114 and/or the shaft 132. The yolks and/or casing may be formed from any material, alloy, or compound having the required structural strength. In certain embodiments, non-ferrous metal or composites may be used to prevent any distortion of cylinder end field flux. In certain embodiments, external bearings may be used to reduce the friction between the shafts and any supporting structure.

In this illustrative discussion, the shaft 132 is mechanically coupled to a driven device 136. In certain embodiments, the driven device 136 may be a flywheel or crankshaft assembly. In yet other embodiments, the driven device 136 may be a device independent of a mechanical coupling, such as a gas or liquid pump.

Surrounding a portion of the shaft 132 is a plurality of electric coils forming part of a coil assembly 134. Each individual coil 134a in the coil assembly 134 is made from a conductive material, such as copper (or a similar alloy) wire and may be constructed using conventional winding techniques known in the art. In certain embodiments, the individual coils 134a are essentially cylindrical in shape being wound around a coil core (not shown) having a center opening sized to allow the individual coil 134a to be secured to the shaft 132. In certain embodiments, the coil(s) are constructed such that a pole opposite of the magnetic cylinder interior poles extends beyond the cylinder end opening.

Although a particular number of coils 134a are illustrated in FIG. 4a, depending on the power requirements of the motor assembly 130, any number of coils could be used to assemble the coil assembly 134. In certain embodiments, the coil assembly includes the individual electric coils and core elements. Such, core elements may include the shaft 132, a portion of the shaft 132, a metal or iron housing, or any similar element which may be energized or turned into an electromagnet when electricity runs through the coils. In some embodiments, the coil assembly 134 may be encased in steel or another material to enhance movement and to protect the coils and/or wiring.

Commutator segments (not shown) electrically connecting the individual coils in the coil assembly 134 in series to each other. In other embodiments, other means, such as wires, etc. typically known in the art can electrically connect the coils to each other in series.

In some embodiments, the commutator segments are in electrical communication with a current source (not shown) via flexible conductors (not shown) running down the shaft 132. Linear slip rings, inductive coupling, or plurality of brushes (not shown) may also be positioned within the magnetic cylinder 114 to provide current to the coils in the coil assembly 134.

FIG. 4a represents the motor assembly 130 when the coil assembly 134 is in a first position or at the top of the stroke. In this position, the iron core or shaft 132 (or portions thereof) is attracted to the magnetic cylinder 114. The magnetic attraction will pull a portion of the iron shaft 132 into the magnetic cylinder 114 as illustrated in FIG. 4b.

Figure 4B:
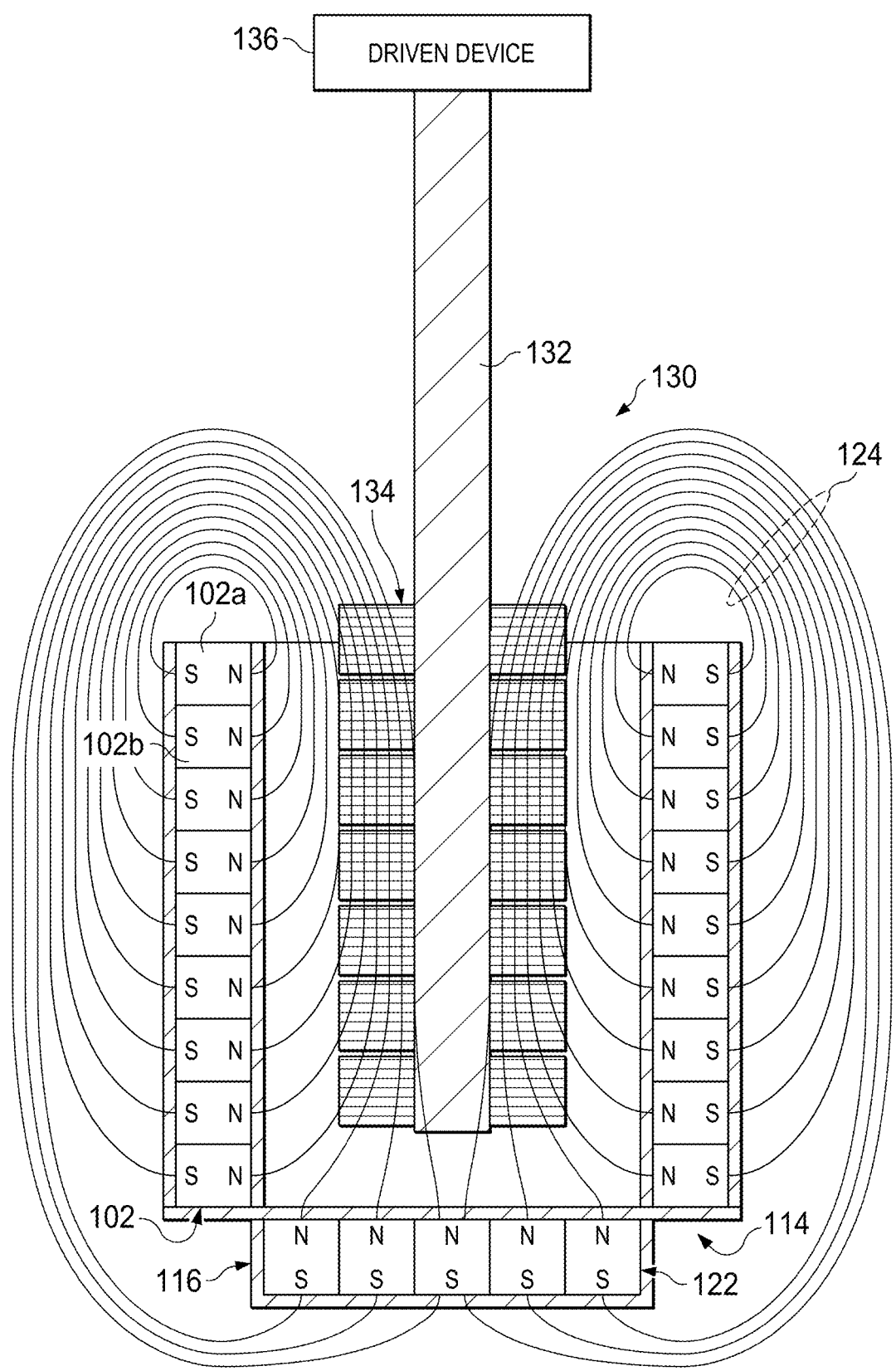
FIG. 4b is a conceptualized section view of a magnetic motor assembly at the bottom of a stroke.

FIG. 4b represents the motor 130 at a second position or the bottom of the power stroke, but before energizing the coil assembly 134.

In FIG. 4c, the coil assembly 134 is then "energized" or supplied with a current of a proper polarity from a power source (not shown) as described above or as otherwise known in the art. This will create repulsive flux forces originating from the center area the coil assembly (or core elements of the coil assembly), circling the coil assembly and flowing back into the center area of the opposing end of the coil assembly. In certain embodiments, the flux forces may be abstractly represented by the flux lines or forces 135. The repulsive flux forces 135 will compress the flux forces 124 of the cylinder 114 and essentially creates an electromagnet out of the shaft 132 having an end 138 or pole of the same polarity as the permanent magnets of the magnetic cap 116. For instance, if the permanent magnets 122 have a north pole facing inward towards the center of the magnetic cylinder 114, the energized shaft 132 would then develop a north pole at its interior end 138.

With the energized shaft 132 functioning essentially as a magnet having a north pole 138 in close proximity to the north poles of the permanent magnets 122 of the end cap 116 and the interior magnetic poles, the magnetic flux lines 124 compress, creating a repulsive magnetic force which will drive the coil assembly 134 and the shaft 132 out of the magnetic cylinder 114. Thus, creating a return stroke back to the starting position as illustrated in FIG. 4d.

In conventional motors, both linear and rotating, enough power of the proper polarity must be supplied to create an opposing (or attracting) force to produce a particular torque. In contrast, certain embodiments of the present invention may supply enough power to change the magnetic domains present in the shaft 132 or core elements. The power to change the domains in the presence of the strong magnetic field generated in the interior of the cylinder 114 is much less than required to create an opposing torque of equal value. Thereby, creating a more efficient electrical motor than traditional technology.

Furthermore, momentum created during the power stroke (if the driven device is a flywheel, for example) may be utilized to assist in the removal of the shaft 132 from the magnetic cylinder 114 resulting in a motor assembly that is more efficient than conventional motor technology. With conventional motors an electrical current of sufficient magnitude must be applied to produce a given horsepower.

Typically, the horsepower produced is equal to electrical power input, e.g. 746 watts=1 horsepower (prox).

In the illustrative example, a 1½"×30" round iron core is attracted into the magnet cylinder 114 with a force of 60 ft. lbs. (60 ft. lbs. torque) which is an exemplary power stroke.

As discussed in reference to FIG. 4c, after the downward power stroke has occurred, the coil assembly 134 may be energized with enough power to change the magnetic domains, which causes a reverse movement or return stroke of the shaft 132. In certain embodiments it may be desirable that the iron core or shaft 132 be made magnetically neutral or balanced, in the illustrative example this can be accomplished with as little as 300 watts (prox). The return stroke can then be generated in several ways. For instance, the use of a small portion of the momentum generated by a flywheel (not shown in FIG. 4c) during the power stroke while the shaft 132 is magnetically balanced or neutral, or mechanically coupling the core to a bicycle type movement or increase power to coil to create sufficient torque to return the shaft to the tope of the stroke. Furthermore, in some embodiments, power may be applied to the coil assembly 134 in both the power and return strokes. Connecting two or more magnetic motor assemblies 130 to a common crank/flywheel with the power strokes out of phase would then produce a continuous power output with little energy consumed to accomplish each stroke.

In other embodiments, the magnetic end cap 116 may be replaced with an open end on the magnetic cylinder 114. If the magnetic cylinder is open on both ends, then a longer stroke with less field strength would result. Furthermore, two polarity reversals per stroke will be applied to the core or shaft 132. In yet, other embodiments, the magnetic cylinder 114 may be coupled to a driven device. Thus, the magnetic cylinder 114 may move relative to a stationary core or coil assembly.

Figure 5A:
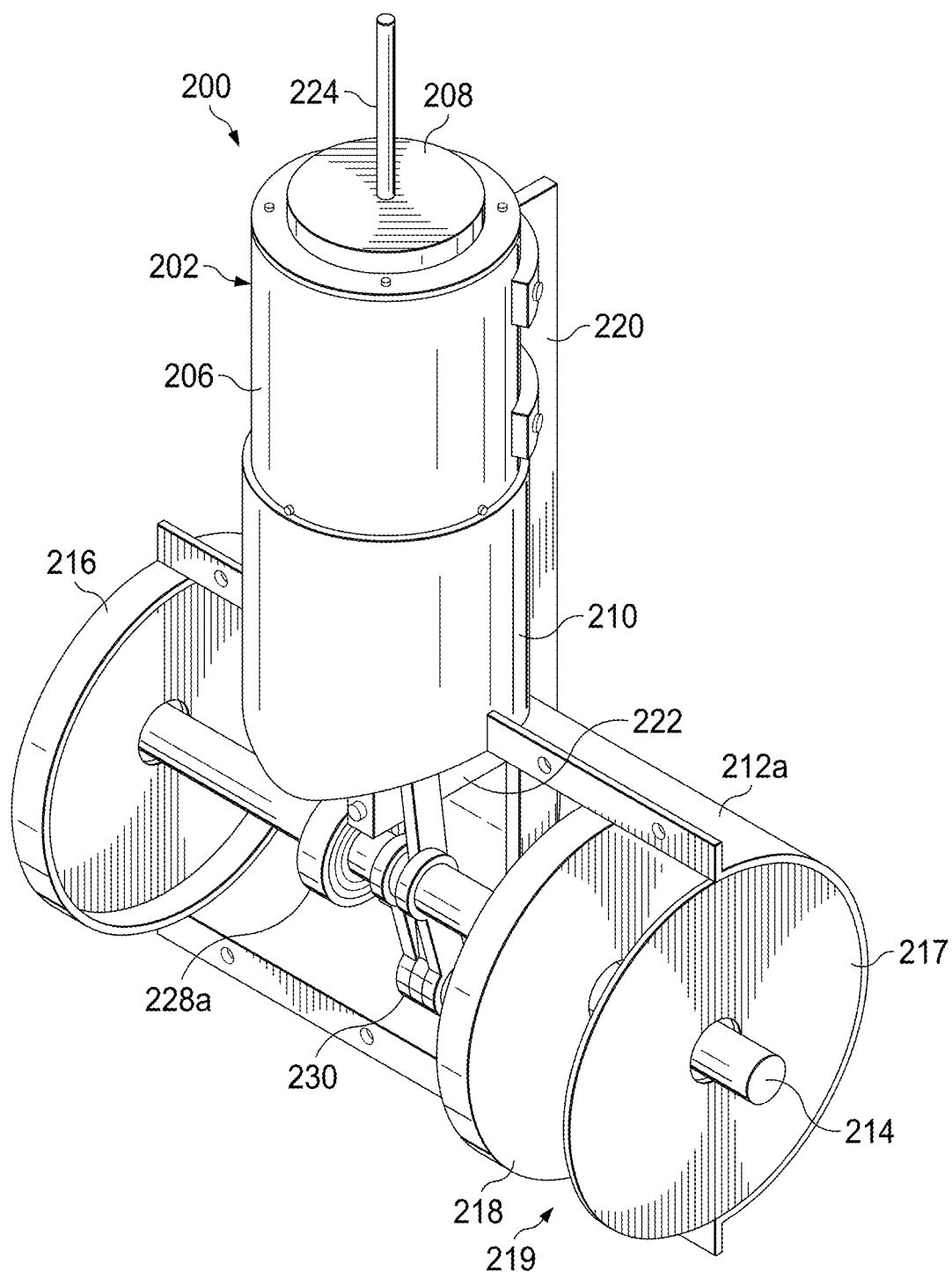
FIG. 5a is an isometric view of a single cylinder engine.
Figure 5B:
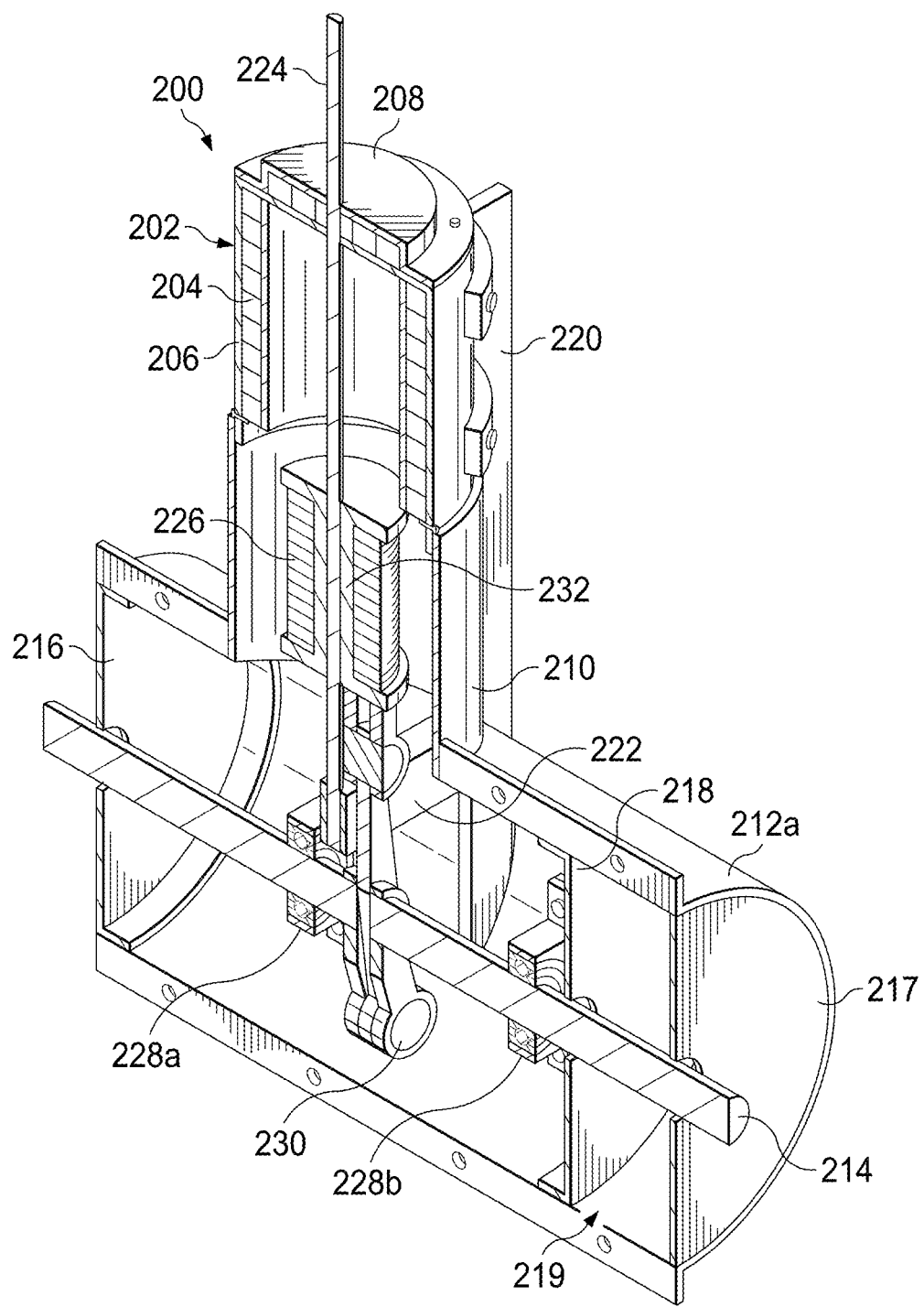

Turning now to FIG. 5a, there is isometric view of a single cylinder engine 200 incorporating an embodiment similar to the electric motor assembly 130 discussed above. In FIG. 5a, a portion of a crankshaft cover has been removed for clarity. FIG. 5b represents a section view of the single cylinder engine 200. The single cylinder engine 200 is conceptually similar to the motor assembly 130 described above and may be considered to be a specific embodiment of the motor assembly 130.

Referring now to both FIG. 5a and FIG. 5b, there is a magnetic motor cylinder 202, which comprises a plurality of magnets 204, retaining cylindrical housings or rings 206, and a magnetic end cap 208 which are similar to corresponding elements previously described in reference to FIGS. 1 through 4e. In this embodiment, the cylinder 202 is connected to a connecting rod cover 210. The connecting rod cover 210 is coupled to a crankshaft cover 212a and 212b (only cover 212a is illustrated in FIGS. 5a and 5b). The covers 212a and 212b comprises two semi-cylindrical halves which couple to each other to form a longitudinal cylindrical cover 212 over the majority of a crankshaft assembly 214 (which may be a single crankshaft rod, a plurality of rods coupled with connecting linkages, or any crankshaft structure known in the art). End caps 216 and 217 cover the ends of the cylindrical cover 212. Additionally, in some embodiments, there may be intermediate interior structural plates 218 which form an electrical compartment 219 to house position sensors assemblies, electronic controls, or other such devices.

In certain embodiments, there may be one or more structural members, such as structural member 220 to provide additional support to the motor. Structural member 220 couples the motor cylinder 202 to the crankshaft cover 212a. In certain embodiments, the structural member 220 may be structurally coupled to a lateral support member 222. In certain embodiments, the lateral support member 222 supports a longitudinal support rod 224, which is generally transverse with respect to the crankshaft assembly 214. As illustrated, the longitudinal support rod 224 is centered about a longitudinal axis of the motor cylinder 202, and in certain embodiments, extends through the end cap 208 of the motor cylinder.

In certain embodiments, interior crankshaft support members 228a and 228b, which are coupled to the crankshaft cover 212a, may provide structural support for the crankshaft or a crankshaft assembly.

A coil assembly 226 may be slideably positioned about the longitudinal support rod 224. In certain embodiments, the coil assembly 226 may be conceptually similar to the coil assembly 134 described above in reference to FIGS. 4a through 4d except the core component has a bore to accommodate the sliding movement of the coil assembly along the support rod 224. A means to allow the coil assembly to move along the support rod, such as a connecting rod linkage 230 couples the coil assembly 226 to the crankshaft assembly 214.

The operation of the engine 200 is similar to the operation of the motor assembly 130 described above with reference to FIGS. 4a through 4d. Iron cores or components 232 in the coil assembly 226 and the connecting rod linkage 230 essentially functions as the shaft 132 of the motor assembly 130 to drive a driven device. The crankshaft assembly 214 is a specific embodiment of the driven device 136. Thus, a detailed discussion of the operation of the engine 200 and the power and return strokes of the engine 200 will not be repeated here for brevity and clarity.

The horsepower generated by the engine 200 depends on the attraction of the unenergized coil assembly 226 into the motor cylinder 202 during the power stroke (as described above with reference to FIGS. 4a through 4d), with ultimate horsepower determined by the size of motor cylinder 202, the size of coil assembly 226, and the speed and frequency of the return stroke and whether additional electrical power is supplied on the return stroke and/or the attraction stroke. In certain embodiments, the motor produces 60 ft lbs of torque. However, the horsepower is a function of the torque times the number of polarity reversals per second.

Figure 6A:
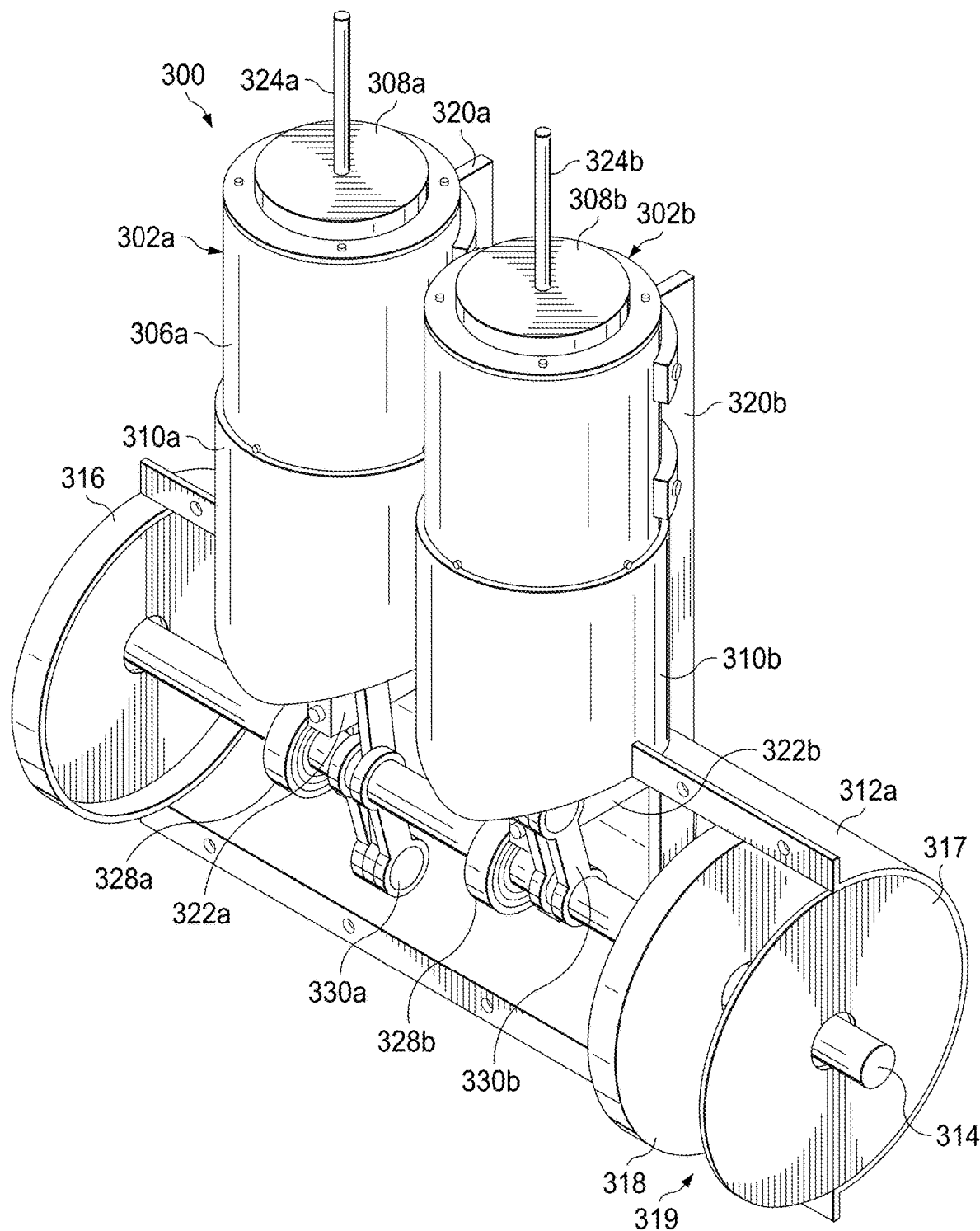
FIG. 6a is an isometric view of a dual cylinder engine.
Figure 6B:
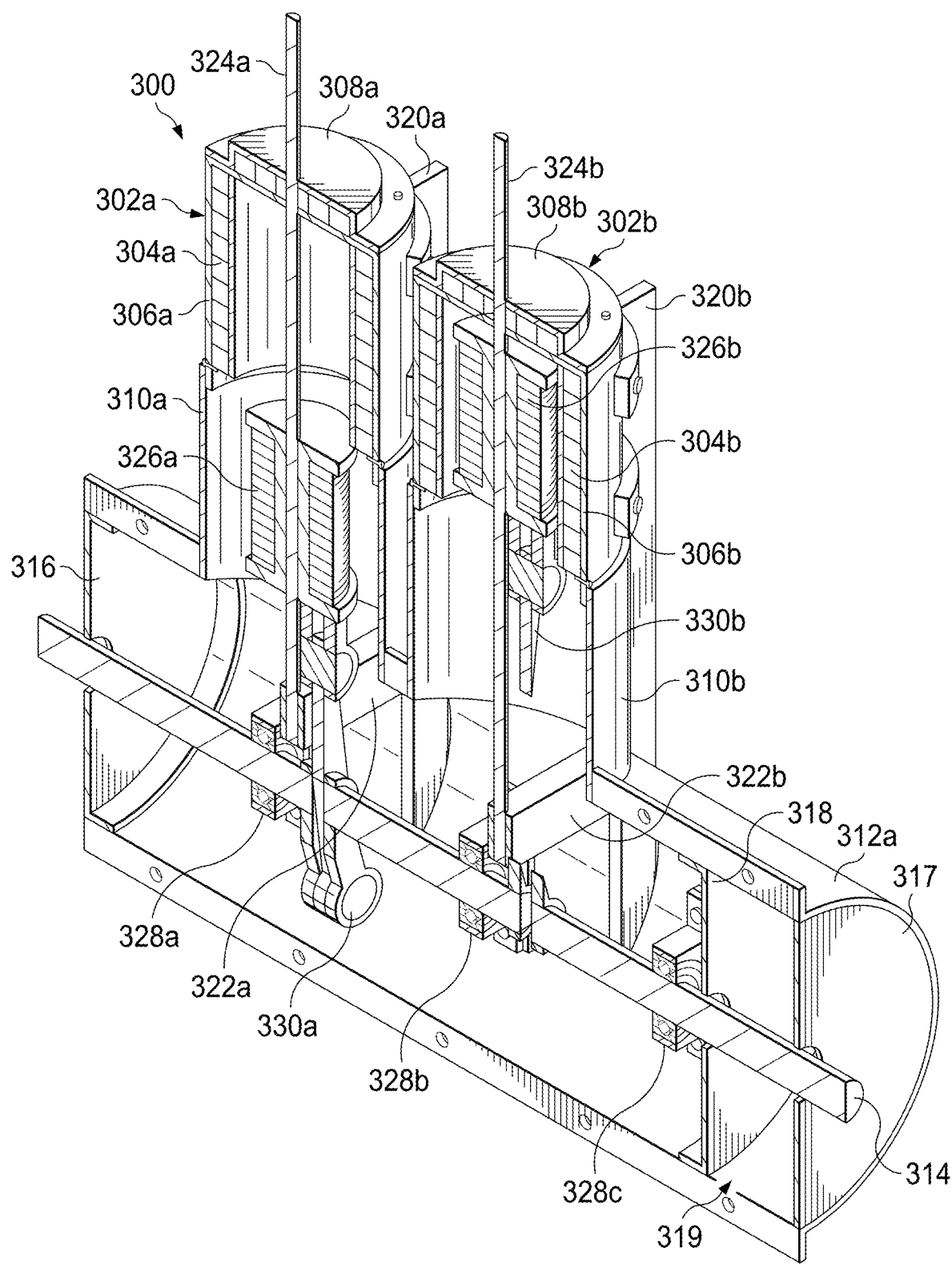

Turning now to FIG. 6a, there is isometric view of a dual cylinder engine 300 incorporating an embodiment similar to the electric motor assembly or cylinder 130 discussed above. In FIG. 6a, a portion of a crankshaft cover has been removed for clarity. FIG. 6b represents a section view of the dual cylinder engine 300.

Referring now to both FIG. 6a and FIG. 6b, there are magnetic motor cylinders 302a and 302b configured in a side by side manner (although any configuration is possible, including a V configuration, or an inline configuration). In this embodiment, the magnetic motor cylinder 302a comprises a plurality of magnets 304a, retaining cylindrical housings or rings 306a, and a magnetic end cap 308a which are similar to corresponding elements previously described in reference the electrical motor assembly 130 described in reference to FIGS. 1 through 4e. Similarly, the magnetic motor cylinder 302b comprises a plurality of magnets 304b, retaining cylindrical housings or rings 306b, and a magnetic end cap 308b which are similar to corresponding elements previously described in reference the electrical motor assembly 130 described in reference to FIGS. 1 through 4e.

In this embodiment, the cylinders 302a and 302b are connected to connecting rod covers 310a and 310b, respectively. The connecting rod covers 310a and 310b are coupled to crankshaft covers 312a and 312b (only cover 312a is illustrated in FIGS. 6a and 6b). The covers 312a and 312b comprises two semi-cylindrical halves which couple to each other to form a longitudinal cylindrical cover 312 over the majority of a crankshaft assembly 314 (which may be a single crankshaft rod, a plurality of rods coupled with connecting linkages, or any crankshaft structure known in the art). End caps or plates 316 and 317 cover the ends of the cylinder created by the cylindrical cover 312. Additionally, in some embodiments, there may be intermediate interior structural plates 318 which form an electrical compartment 319 to house position sensors assemblies, electronic controls, or other such devices.

In certain embodiments, there may be one or more structural members, such as structural members 320a and 320b to provide additional support to the dual cylinder engine 300. Structural member 320a couples the motor cylinder 302a to the crankshaft cover 312a. In certain embodiments, the structural member 320a may be structurally coupled to a lateral support member 322a. In certain embodiments, the lateral support member 322a supports a longitudinal support rod 324a, which is generally transverse with respect to the crankshaft assembly 314. As illustrated, the longitudinal support rod 324a is centered about a longitudinal axis of the motor cylinder 302a, and in certain embodiments, extends through the end cap 308a of the motor cylinder.

Similarly, the structural member 320b couples the motor cylinder 302b to the crankshaft cover 312a. In certain embodiments, the structural member 320b may be structurally coupled to a lateral support member 322b. In certain embodiments, the lateral support member 322b supports a longitudinal support rod 324b, which is generally transverse with respect to the crankshaft assembly 314. As illustrated, the longitudinal support rod 324b is centered about a longitudinal axis of the motor cylinder 302b, and in certain embodiments, extends through the end cap 308b of the motor cylinder.

In certain embodiments, interior crankshaft support members 328a, 328b, and 328c which are coupled to the crankshaft cover 312 may provide structural support for the crankshaft assembly 314.

With respect to the first cylinder or motor cylinder 302a, a coil assembly 326a may be slideably positioned about the longitudinal support rod 324a. A connecting rod linkage 330a couples the coil assembly 326a to the crankshaft assembly 314. Similarly, with respect to the second cylinder or motor cylinder 302b, a coil assembly 326b may be slideably positioned about the longitudinal support rod 324b. A connecting rod linkage 330b couples the coil assembly 326b to the crankshaft assembly 314. In certain embodiments, the coil assemblies 326a and 326b may be similar to the coil assembly 226 described above in reference to FIGS. 5a through 5b.

Figure 7A:
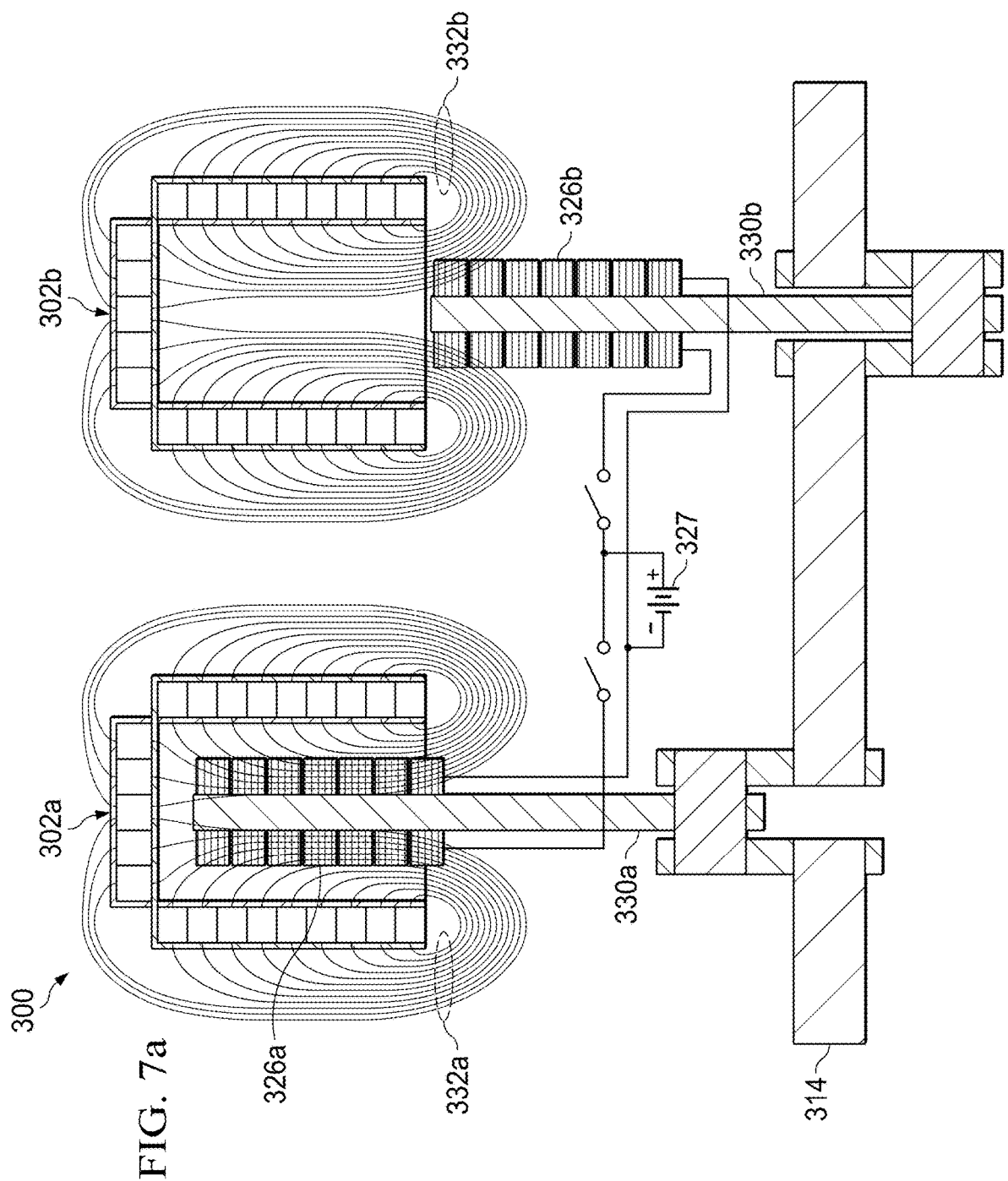

FIG. 7a is a schematic illustration of the dual cylinder engine 300 when the coil assembly 326a is in a first position with respect to the magnetic cylinder 302a and the coil assembly 326b is in a second position with respect to the magnetic cylinder 302b. As explained above in reference to FIGS. 6a and 6b, the coil assembly 326a is mechanically coupled to the crankshaft assembly 314 through the connecting rod linkage 330a, which as illustrated, is fully extended to its maximum length. The coil assembly 326b is mechanically coupled to the crankshaft assembly 314 through the connecting rod linkage 330b, which as illustrated is folded back to its minimum length.

In the position illustrated in FIG. 7a, coil assemblies 326a and 326b are in an un-energized configuration. In other words, electrical power from a power source 327 has not yet been applied to energize one of the coil assemblies (as described above). So, the flux forces 332a and 332b generated by the respective magnetic cylinders 302a and 302b are similar to the flux forces 124 described above in reference to FIGS. 3 and 4a.

The magnetic and iron elements of the coil assemblies 326a and 326b are attracted to their respective magnetic cylinders 302a and 302b. However, because of the mechanical configuration of the connecting rod linkages 330a and 330b with the crankshaft assembly 314, only one coil assembly can be at the "top" of a stroke at any given time (i.e., closest to the crankshaft assembly 314). In other words, in the illustrative embodiment, each coil assembly is out of phase with the other coil assembly. In certain embodiments, when one coil assembly is at the top of the stroke, the other coil assembly is at the bottom of the stroke (i.e. farthest from the crankshaft assembly 314). FIG. 7a illustrates a situation where the magnetic attraction of the magnetic cylinder 302a has pulled the coil assembly 326a to a first position or bottom of the stroke. When the coil assembly 326a is at the bottom of its stroke, the mechanical configuration of the crankshaft assembly 314 and connecting rod linkages 328a and 328b forces the coil assembly 326b to be at the top of its respective stroke (i.e., closet to the crankshaft assembly 314).

In FIG. 7b, the coil assembly 326a is then "energized" or supplied with a current of a proper polarity from the power source 327. This will create repulsive flux forces 334a around the coil assembly 326a. In certain embodiments, the repulsive flux forces 334a originates from the center area the coil assembly 326a (or core elements of the coil assembly), circling the coil assembly and flowing back into the center area of the opposing end of the coil assembly. In certain embodiments, the flux forces may be abstractly represented by the flux lines or forces 334a. The repulsive flux forces 334a will compress the flux forces 332a of the cylinder 302a and essentially creates an electromagnet out of the coil assembly 326a having an end 336a or pole of the same polarity as the permanent magnets of the magnetic cap 308a. For instance, if the permanent magnets of the magnetic cap 308a have a north pole facing inward towards the interior of the magnetic cylinder 302a, the energized coil assembly 326a (or the core elements of the coil assembly 326a) would then develop a north pole at its interior end 336a.

With the coil assembly 326a functioning essentially as a magnet having a north pole at its interior end 336a in close proximity to the north poles of the permanent magnets of the end cap 308a and the interior magnetic poles, the magnetic flux forces 332a compress, creating a repulsive magnetic force which will drive the coil assembly 326a out of the magnetic cylinder 302a—creating a power stroke. The coil assembly 326a, will in turn, push on the connecting linkage 330a.

As the connecting linkage 330a is forced towards the crankshaft assembly 314, the crankshaft turns so that the linkage 330a can fold in on itself. This turning of the crankshaft assembly 314 will then cause the linkage 330b to begin to extend towards the magnetic cylinder 302b.

As the coil assembly 326b begins a return stroke, the magnetic or iron components of the coil assembly are attracted to the magnets in the magnetic cylinder 302b, thus causing the coil assembly 326b to be pulled into the magnetic cylinder 302b.

FIG. 7c is a schematic illustration of the dual cylinder engine 300 once the coil assembly 326b has been pulled into the magnetic cylinder 302b and coil assembly 326a has been driven out of the magnetic cylinder 302a. Thus, as illustrated, connecting rod linkage 330a is now folded back to its minimum length and the connecting rod linkage 330b is extended to its maximum length.

In the position illustrated in FIG. 7c, coil assemblies 326a and 326b are in an un-energized configuration. In other words, electrical power from the power source 327 has not yet been applied to energize one of the coil assemblies (as described above). So, the flux forces 332a and 332b generated by the respective magnetic cylinders 302a and 302b are similar to the flux forces 124 described above in reference to FIGS. 3 and 4a.

FIG. 7c illustrates a situation where the magnetic attraction of the magnetic cylinder 302b and the repulsive force on the coil assembly 326a (coupled to the linkage 330a and crankshaft assembly 314) has pulled the coil assembly 326b to the bottom of the stroke. When the coil assembly 326b is at the bottom of its stroke, the mechanical configuration of the crankshaft assembly 314 and connecting rod linkages 330a and 330b forces the coil assembly 326a to be at the top of its respective stroke (i.e., closet to the crankshaft assembly 314).

Figure 7D:
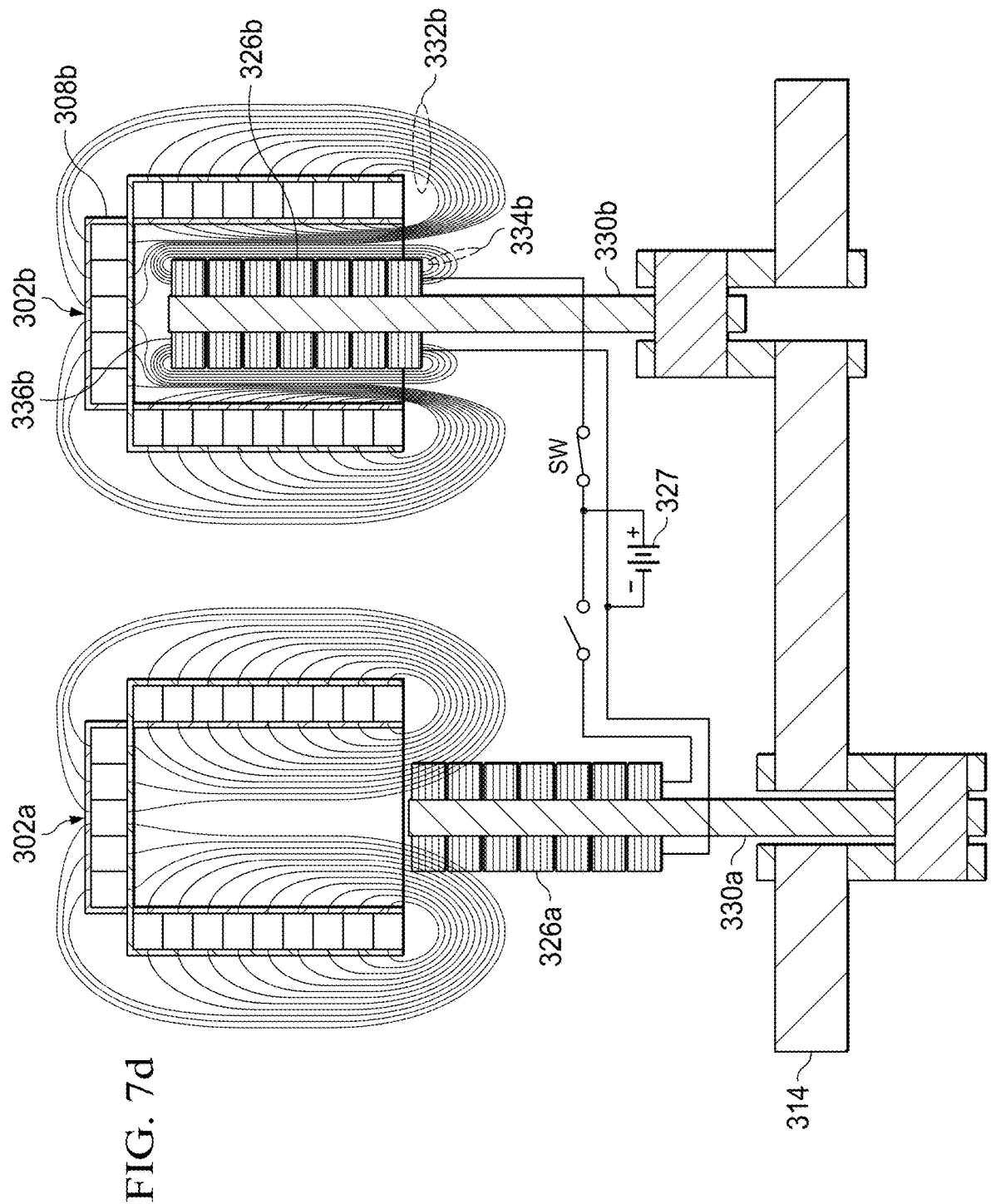

In FIG. 7d, the coil assembly 326b is then "energized" or supplied with a current of a proper polarity from the power source 327. This will create repulsive flux forces 334b around the coil assembly 326b. In certain embodiments, the repulsive flux forces 334b originates from the center area the coil assembly 326b (or core elements of the coil assembly), circling the coil assembly and flowing back into the center area of the opposing end of the coil assembly. In certain embodiments, the flux forces may be abstractly represented by the flux lines or forces 334b. The repulsive flux forces 334b will compress the flux forces 332b of the cylinder 302b and essentially creates an electromagnet out of the coil assembly 326b having an end 336b or pole of the same polarity as the permanent magnets of the magnetic cap 308b. For instance, if the permanent magnets of the magnetic cap 308b have a north pole facing inward towards the interior of the magnetic cylinder 302b, the energized coil assembly 326b would then develop a north pole at its interior end 336b.

With the coil assembly 326b functioning essentially as a magnet having a north pole at its end 336b in close proximity to the north poles of the permanent magnets of the end cap 308a and the interior magnetic poles, the magnetic flux forces 332b compress, creating a repulsive magnetic force which will drive the coil assembly 326b and the connecting linkage 330b away from the magnetic cylinder 302b—creating a power stroke.

As the connecting linkage 330b is forced towards the crankshaft assembly 314, the crankshaft turns so that the linkage 330b can fold in on itself. This turning of the crankshaft assembly 314 will also cause the linkage 330a to begin to extend towards the magnetic cylinder 302a.

As the coil assembly 326a begins a return stroke, the magnetic or iron components of the coil assembly are attracted to the magnets in the magnetic cylinder 302a, thus causing the coil assembly 326a to be pulled into the magnetic cylinder 302a as illustrated in FIG. 7a.

The cycle illustrated by FIGS. 7a through 7d can then repeat, with each stroke turning the crankshaft assembly 314, which in turn can drive a transmission, pump or another mechanical device. A flywheel (not shown) can be coupled to the crankshaft to allow its inertia to assist in the turning of the crankshaft and to smooth out the flow of the strokes.

The horsepower generated the engine 300 depends on the attraction of the unenergized coil assemblies 326a and 326b into the motor cylinders 302a and 302b, respectively during the alternating power strokes (as described above with reference to FIGS. 7a through 7d), with ultimate horsepower determined by the size of motor cylinders 302a and 302b, the size of coil assemblies 326a and 326b, and the speed and frequency of the respective power and return strokes and whether additional electrical power is supplied on the respective return stroke and/or the attraction stroke. The horsepower is a function of the torque times the number of polarity reversals per second.

The foregoing description of the embodiments of the invention has been presented for the purposes of illustration and description. It is not intended to be exhaustive or to limit the invention to the precise form disclosed. Many combinations, modifications and variations are possible in light of the above teaching. Undescribed embodiments which have interchanged components are still within the scope of the present invention. It is intended that the scope of the invention be limited not by this detailed description, but rather by the claims appended hereto.

For instance, in certain embodiments there may be a method of producing an engine stroke cycle, the method comprising: creating a stacked plurality of magnetic flux forces about a magnetic cylinder such that each magnetic flux force travels between a first pole of an inward face of a magnet of the magnetic cylinder, around an open end of the magnetic cylinder, and back to a second pole of an exterior face of the magnet, creating a second stacked plurality of magnetic flux forces about a closed end of the magnetic cylinder such that each magnetic flux force travels between a first pole of an inward face of a magnet positioned on the closed, around the open end of the magnetic cylinder, and back to a second pole of an exterior face of the magnet, creating a power stroke by moving a coil and a shaft coupled to the coil partially through the first stacked plurality and second stacked plurality of magnetic flux forces in a center area of the magnetic cylinder, and applying a current to the coil to change the magnetic domain of the shaft, moving the coil and the shaft out of the magnetic cylinder to complete the engine stroke cycle.

A method of producing an engine stroke cycle, the method comprising: moving a coil assembly, having at least one core element, partially through a first plurality magnets positioned about a cylindrical wall of a magnetic cylinder wherein each of the magnets of the first plurality of magnets have similar poles pointed at the first longitudinal axis, moving the coil assembly in proximity to a plurality of end magnets positioned on a closed end of the magnetic cylinder having similar poles pointed towards an interior of the magnetic cylinder, applying a current to the coil assembly to create a magnetic repulsive forces at an interior end of the at least one core element, and moving the coil assembly out of the magnetic cylinder to complete the engine stroke cycle.

In yet other embodiments, there may be above methods wherein the step of applying a current further comprises apply only enough current to change the magnetic domain of the at least one core element.

In yet other embodiments, there may be above methods, wherein the step of moving a coil assembly further comprises keeping a portion of the coil assembly outside of the magnetic cylinder.

In yet other embodiments, there may be above methods, wherein the step of applying a current comprises routing a current through a conductor means such as a flexible conductor coupled to the coil assembly.

In yet other embodiments, there may be above methods, further comprising rotating a crankshaft as the coil assembly moves out of the magnetic cylinder.

In yet other embodiments, there may be above methods, further comprising rotating a crankshaft assembly as the coil assembly moves into the magnetic cylinder.

The method of any of the above claims, further comprising rotating a flywheel coupled to the crankshaft assembly.

In yet other embodiments, there may be the above methods further comprising using a portion of momentum generated by the flywheel during the power stroke while the shaft is magnetically balanced or neutral.

In yet other embodiments, there may be the above methods further comprising connecting a second magnetic cylinder and a second shaft to a common crank/flywheel out of phase with the first shaft to produce a continuous power output.

In certain embodiments, there may be an electrical motor comprising: a magnetic cylinder, a magnetic cap coupled to one end of the magnetic cylinder, a coil assembly of conductive material slidingly coupled to the magnetic cylinder such that the coil assembly moves from a first position to a second position, wherein in the first position, the coil assembly is outside of the magnetic cylinder and in the second position, the coil assembly is partially or wholly inside the magnetic cylinder, a core coupled to the coil, and a means for applying current to the coil.

In yet other embodiments, there may be the above motor wherein the magnetic cylinder further comprises: an outer ring, a plurality of permanent magnets positioned within the outer ring, such that a magnetic pole of each of the plurality of magnets face towards the interior of the magnetic cylinder.

In yet other embodiments, there may be the above motors wherein the magnetic cylinder further comprises an inner ring.

In yet other embodiments, there may be the above motors wherein the magnetic cap further comprises: an inner end plate coupled to the magnetic cylinder, an outer end plate, a structure coupling the outer end plate to the inner end plate, a plurality of permanent magnets positioned between the inner end plate and the outer end plate such that a magnetic pole of each of the plurality of magnets face towards the interior of the magnetic cylinder.

In yet other embodiments, there may be the above motors wherein the core is made from a ferrous material, iron or ferrite powder suspended in a viscous material.

In yet other embodiments, there may be the above motors wherein the shaft is made from a ferrous material suspended in a viscous material.

In yet other embodiments, there may be the above motors wherein the magnetic cylinder is made from a plurality of magnetic discs.

In yet other embodiments, there may be the above motors further comprising a plurality of yolks coupling the magnetic cylinder to the coil assembly.

In yet other embodiments, there may be the above motors further comprising a casing coupling the magnetic cylinder to the coil assembly.

In yet other embodiments, there may be an electric motor comprising: a means for creating a stacked plurality of magnetic flux forces about a magnetic cylinder such that each magnetic flux force travels between a first pole of an inward face of a magnet of the magnetic cylinder, around an open end of the magnetic cylinder, and back to a second pole of an exterior face of the magnet, a means for creating a second stacked plurality of magnetic flux forces about a closed end of the magnetic cylinder such that each magnetic flux force travels between a first pole of an inward face of a magnet positioned on the closed, around the open end of the magnetic cylinder, and back to a second pole of an exterior face of the magnet, a means for moving a coil and a shaft coupled to the coil partially through the first stacked plurality and second stacked plurality of magnetic flux forces in a center area of the magnetic cylinder, and a means for changing the magnetic domain of the shaft, a means for moving the coil and the shaft out of the magnetic cylinder to complete the engine stroke cycle.

In some embodiments, there is an electric motor apparatus characterized by a cylinder comprising a longitudinal center axis and one or more magnets having similar magnetic poles pointing toward the longitudinal axis to create a first plurality of magnetic forces; a first coil assembly, including, one or more electric coils; one or more core elements coupled to the one or more electric coils, a means to allow the coil assembly to move into and out of the cylinder, a means to apply electric current to the coil assembly when the coil assembly is positioned within the cylinder such that the coil assembly will create a second plurality of magnetic forces, wherein the second plurality of magnetic forces are repulsed by the first plurality of magnetic forces.

In yet other embodiments, there is the above electric motor apparatus or motor wherein the first plurality of magnetic forces are a stacked plurality of magnetic flux forces about the magnetic cylinder such that each magnetic flux force travels between a first pole of an inward face of a magnet of the magnetic cylinder, around an open end of the magnetic cylinder, and back to a second pole of an exterior face of the magnet.

In yet other embodiments, there are the above electric motors further comprising an end cap coupled to the cylinder to create a closed end, wherein the end cap includes one or more magnets orientated such that similar magnetic poles face an interior of the cylinder and the magnets of the end cap have a repulsive magnetic force with respect to second plurality of magnetic forces created by the coil assembly.

In yet other embodiments, there are the above electric motors wherein the one or more magnets of the end cap are orientated to create a second stacked plurality of magnetic flux forces such that each magnetic flux force travels between a first pole of an inward face of a magnet of the end cap, around an open end of the magnetic cylinder, and back to a second pole of an exterior face of the magnet.

In yet other embodiments, there are the above electric motors wherein the means to apply electric current to the coil applies a minimum amount of current to change the magnetic domain of the core elements.

In yet other embodiments, there are the above electric motors where the means to allow the coil assembly to move into and out of the cylinder comprises a first connecting means coupled to a crankshaft assembly.

In yet other embodiments, there are the above electric motors further comprising: a second cylinder comprising one or more magnets and a second longitudinal center axis, wherein the one or more magnets have similar magnetic poles pointing toward the longitudinal axis to create a first plurality of magnetic forces; a second electric coil assembly, including, one or more electric coils one or more core elements coupled to the one or more electric coils, a means to allow the coil assembly to move into and out of the cylinder, a means to apply electric current to the coil assembly when the coil assembly is positioned within the cylinder such that the core apparatus will create a second plurality of magnetic forces, wherein the second plurality of magnetic forces are repulsed by the first plurality of magnetic forces.

In yet other embodiments, there are the above electric motors further comprising: a second connecting means for connecting the second coil to the crankshaft assembly such that when the first coil assembly is at a top of its stroke, the second coil assembly is at a bottom of its stroke.

In yet other embodiments, there are the above electric motors further comprising a flywheel to provide momentum to the crankshaft assembly.

In certain embodiments, there is a method of producing an engine stroke cycle, the method characterized by: moving a coil assembly through a magnetic cylinder having a stacked plurality of similarly polarized magnetic flux forces about the magnetic cylinder such that each magnetic flux force travels between a first pole of an inward face of a magnet of the magnetic cylinder, around an open end of the magnetic cylinder, and back to a second pole of an exterior face of the magnet, applying a current to the coil assembly to change the magnetic domain of core elements of the coil assembly and create a repulsive magnetic force on the coil assembly, and pushing a connecting rod assembly as the coil assembly is repulsed out of the magnetic cylinder.

In yet some embodiments, there is the above method further comprising moving the coil assembly through a second stacked plurality of magnetic flux forces about a closed end of the magnetic cylinder such that each similarly polarized magnetic flux force travels between a first pole of an inward face of a magnet positioned on the closed, around the open end of the magnetic cylinder, and back to a second pole of an exterior face of the magnet.

In yet some embodiments, there are the above methods further comprising turning a crankshaft assembly when the connecting rod assembly is pushed by the coil assembly.

In yet some embodiments, there are the above methods further comprising coupling the crankshaft assembly to flywheel to rotate the flywheel and generate momentum of the flywheel.

In yet some embodiments, there are the above methods, further comprising: moving a second coil assembly through a second magnetic cylinder having a stacked plurality of magnetic flux forces about the magnetic cylinder such that each magnetic flux force travels between a first pole of an inward face of a magnet of the magnetic cylinder, around an open end of the magnetic cylinder, and back to a second pole of an exterior face of the magnet, moving the second coil assembly through a second stacked plurality of magnetic flux forces about a closed end of the second magnetic cylinder such that each magnetic flux force travels between a first pole of an inward face of a magnet positioned on the closed, around the open end of the magnetic cylinder, and back to a second pole of an exterior face of the magnet; applying a current to the coil assembly to change the magnetic domain of core elements of the coil assembly and creating a repulsive magnetic force on the coil assembly, and pushing a second connecting rod assembly as the coil assembly is repulsed out of the magnetic cylinder.

In yet some embodiments, there are the above methods further comprising rotating the crankshaft assembly with the second connecting rod assembly such that the first coil assembly is out of phase with the second coil assembly as the crankshaft is rotated by the first connecting assembly and the second connecting assembly.

In yet other embodiments, there may be the above motors wherein the means of applying a current further comprises means for applying only enough current to change the magnetic domain of the shaft.

In yet other embodiments, there may be the above motors wherein the means of moving a coil and a shaft further comprises a means for keeping a portion of the coil outside of the magnetic cylinder.

In yet other embodiments, there may be the above motors further comprising a means for coupling the shaft to a flywheel to rotate the flywheel and generate momentum of the flywheel.

In yet other embodiments, there may be the above motors further comprising a means for mechanically coupling the shaft to crank shaft.

In yet other embodiments, there may be the above motors further comprising a means for connecting a second magnetic cylinder and a second shaft to a common crank/flywheel out of phase with the first shaft to produce a continuous power output.

In yet other embodiments, there is a an electrical engine comprising: a first magnetic cylinder, including: a first longitudinal axis, a first plurality magnets positioned about a cylindrical wall of the first magnetic cylinder and having similar poles pointed at the first longitudinal axis and generating a first stacked magnetic flux forces about the first magnetic cylinder such that each magnetic flux force travels between a first pole of an inward face of each magnet in the first plurality of magnets around an open end of the first magnetic cylinder, and back to a second pole of an exterior face of each magnet in the first plurality of magnets, a first plurality of end magnets positioned on a closed end of the first magnetic cylinder having similar poles pointed towards an interior of the first magnetic cylinder and creating an additional plurality of magnetic flux forces about the closed end of the first magnetic cylinder such that each magnetic flux force travels between a first pole of an inward face of a magnet in the plurality of end magnets, around the open end of the first magnetic cylinder, and back to a second pole of an exterior face of the magnet in the first plurality of end magnets, a first coil assembly comprising: at least one core element, at least one electrical coil positioned around a core element, wherein the first coil assembly is sized to be slideably positioned within the first magnetic cylinder, a first housing coupled to the first magnetic cylinder, the housing including support structures to allow the first coil assembly to move from a first position wherein the first coil assembly is substantially positioned outside of the first magnetic cylinder to a second position wherein the first coil assembly is substantially positioned within the first magnetic cylinder, a second magnetic cylinder, including: a second longitudinal axis, a second plurality magnets positioned about a cylindrical wall of the second magnetic cylinder and having similar poles pointed at the second longitudinal axis and generating a second stacked magnetic flux forces about the second magnetic cylinder such that each magnetic flux force travels between a second pole of an inward face of each magnet in the second plurality of magnets around an open end of the second magnetic cylinder, and back to a second pole of an exterior face of each magnet in the second plurality of magnets, a second plurality of end magnets positioned on a closed end of the second magnetic cylinder having similar poles pointed towards an interior of the second magnetic cylinder and creating an additional plurality of magnetic flux forces about the closed end of the second magnetic cylinder such that each magnetic flux force travels between a second pole of an inward face of a magnet in the plurality of end magnets, around the open end of the second magnetic cylinder, and back to a second pole of an exterior face of the magnet in the second plurality of end magnets, a second coil assembly comprising: at least one core element, at least one electrical coil positioned around a core element, wherein the second coil assembly is sized to be slideably positioned within the second magnetic cylinder, a second housing coupled to the second magnetic cylinder, the housing including support structures to allow the second coil assembly to move from a first position wherein the first coil assembly is substantially positioned outside of the first magnetic cylinder to a second position wherein the first coil assembly is substantially positioned within the first magnetic cylinder.

In other embodiments, there is an electrical engine comprising: a magnetic cylinder, including: a longitudinal axis, a plurality of magnets positioned about a cylindrical wall of the magnetic cylinder and having similar poles pointed at the longitudinal axis, a plurality of end magnets positioned on a closed end of the magnetic cylinder having similar poles pointed towards an interior of the magnetic cylinder, a coil assembly comprising: at least one core element, a first electrical coil positioned around the at least one core element, wherein the coil assembly is sized to be slideably positioned within the magnetic cylinder, and a housing coupled to the magnetic cylinder, the housing including support structures to allow the coil assembly to move from a first position wherein the first coil assembly is substantially positioned outside of the magnetic cylinder to a second position wherein the first coil assembly is substantially positioned within the first magnetic cylinder.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112, paragraph 6.

Other embodiments may include the following exemplary claims:

Exemplary claim 1. An electrical engine comprising: a first magnetic cylinder, including: a first longitudinal axis, a first plurality magnets positioned about a cylindrical wall of the first magnetic cylinder and having similar poles pointed at the first longitudinal axis and generating a first stacked magnetic flux forces about the first magnetic cylinder such that each magnetic flux force travels between a first pole of an inward face of each magnet in the first plurality of magnets around an open end of the first magnetic cylinder, and back to a second pole of an exterior face of each magnet in the first plurality of magnets, a first plurality of end magnets positioned on a closed end of the first magnetic cylinder having similar poles pointed towards an interior of the first magnetic cylinder and creating an additional plurality of magnetic flux forces about the closed end of the first magnetic cylinder such that each magnetic flux force travels between a first pole of an inward face of a magnet in the plurality of end magnets, around the open end of the first magnetic cylinder, and back to a second pole of an exterior face of the magnet in the first plurality of end magnets, a first coil assembly comprising: at least one core element, at least one electrical coil positioned around a core element, wherein the first coil assembly is sized to be slideably positioned within the first magnetic cylinder, a first extendable linkage coupled to the first coil adapted to extending from a first position wherein the first coil assembly is substantially positioned outside of the first magnetic cylinder to a second position wherein the first coil assembly is substantially positioned within the first magnetic cylinder, a second magnetic cylinder, including: a second longitudinal axis, a second plurality magnets positioned about a cylindrical wall of the second magnetic cylinder and having similar poles pointed at the second longitudinal axis and generating a second stacked magnetic flux forces about the second magnetic cylinder such that each magnetic flux force travels between a second pole of an inward face of each magnet in the second plurality of magnets around an open end of the second magnetic cylinder, and back to a second pole of an exterior face of each magnet in the second plurality of magnets, a second plurality of end magnets positioned on a closed end of the second magnetic cylinder having similar poles pointed towards an interior of the second magnetic cylinder and creating an additional plurality of magnetic flux forces about the closed end of the second magnetic cylinder such that each magnetic flux force travels between a second pole of an inward face of a magnet in the plurality of end magnets, around the open end of the second magnetic cylinder, and back to a second pole of an exterior face of the magnet in the second plurality of end magnets, a second coil assembly comprising: at least one core element, at least one electrical coil positioned around a core element, wherein the second coil assembly is sized to be slideably positioned within the second magnetic cylinder, a second extendable linkage coupled to the second coil adapted to extending from a first position wherein the second coil assembly is substantially positioned outside of the second magnetic cylinder to a second position wherein the second coil assembly is substantially positioned within the second magnetic cylinder.

Exemplary claim 2. The electrical engine of exemplary claim 1, further comprising a mechanical assembly coupling the first extendable linkage to the second extendable linkage.

Exemplary claim 3. The electrical engine of exemplary claim 2, wherein the mechanical assembly is a crankshaft assembly.

Exemplary claim 4. The electrical engine of exemplary claim 1, wherein the first longitudinal axis is parallel to the second longitudinal axis.

Exemplary claim 5. The electrical engine of exemplary claim 1, wherein the first longitudinal axis is co-linear with the second longitudinal axis.

Exemplary claim 6. The electrical engine of exemplary claim 1, wherein the first longitudinal axis intersects the second longitudinal axis.

Exemplary claim 7. The electrical engine of exemplary claim 1, wherein the first longitudinal axis forms a V with the second longitudinal axis when viewed from an angle generally transverse from first longitudinal axis and the second longitudinal axis.

Exemplary claim 8. The electrical engine of exemplary claim 3, further comprising a flywheel coupled to the crankshaft assembly.

Exemplary claim 9. An electrical engine comprising: a magnetic cylinder, including: a longitudinal axis, a plurality of magnets positioned about a cylindrical wall of the magnetic cylinder and having similar poles pointed at the longitudinal axis a plurality of end magnets positioned on a closed end of the magnetic cylinder having similar poles pointed towards an interior of the magnetic cylinder, a coil assembly comprising: at least one core element, a first electrical coil positioned around the at least one core element, wherein the coil assembly is sized to be slideably positioned within the magnetic cylinder, and a extendable linkage coupled to the coil adapted to extending from a first position wherein the coil assembly is substantially positioned outside of the magnetic cylinder to a second position wherein the coil assembly is substantially positioned within the magnetic cylinder.

Exemplary claim 10. The electrical engine of exemplary claim 9, wherein the plurality of magnets are positioned about the magnetic cylinder to generate stacked magnetic flux forces about the magnetic cylinder such that each magnetic flux force travels between a pole of an inward face of each magnet in the plurality of magnets around an open end of the magnetic cylinder, and back to a second pole of an exterior face of each magnet in the plurality of magnets.

Exemplary claim 11. The electrical engine of exemplary claim 9, wherein the plurality of end magnets are positioned to generate magnetic flux forces about the closed end of the magnetic cylinder such that each magnetic flux force travels between a pole of an inward face of a magnet in the plurality of end magnets, around the open end of the magnetic cylinder, and back to a second pole of an exterior face of the magnet in the plurality of end magnets.

Exemplary claim 12. The electrical engine of exemplary claim 9, wherein the cylindrical wall is an exterior wall.

Exemplary claim 13. The electrical engine of exemplary claim 12, further comprising an interior cylindrical wall.

Exemplary claim 14. The electrical engine of exemplary claim 9, wherein the core element is selected from the group consisting of iron, ferrite powder, a ferrite compound and a ferrite powder suspended in a viscous material.

Exemplary claim 15. The electrical engine of exemplary claim 9, further comprising a casing enclosing the core element.

Exemplary claim 16. The electrical engine of exemplary claim 9, wherein the coil assembly further comprises an additional coil positioned about the at least one core element electrically coupled to the first electrical coil.

Exemplary claim 17. The electrical engine of exemplary claim 9, wherein the magnetic cylinder comprises a plurality of magnetic rings concentrically stacked and coupled to each other to form the magnetic cylinder.

Exemplary claim 18. The electrical engine of exemplary claim 17, wherein each of the magnetic rings comprises: a center axis, an interior ring, an exterior ring, a plurality of magnets positioned between the interior ring and the exterior ring, such that similar magnetic poles of each of the magnets point towards the center axis, and a coupling mechanism for attaching each ring to another ring.

Exemplary claim 19. The electrical engine of exemplary claim 9, further comprising an end cap coupled to one end of the magnetic cylinder, wherein the end cap comprises: an end plate coupled to a cylindrical wall of the magnetic cylinder, an end ring forming a side wall of the end cap, a end cap plate coupled to the end ring, an interior plate coupled to the end plate such that the interior plate, the end ring, and the end plate forms a compartment for containing the plurality of end magnets.

Exemplary claim 20. The electrical engine of exemplary claim 9, wherein the plurality of end magnets extend into the interior of the magnetic cylinder.

What is claimed is:
1. An electric motor comprising:
a magnetic cylinder centered around a longitudinal axis, the magnetic cylinder including a plurality of magnets having poles of a first polarity facing an interior cavity of the magnetic cylinder and oriented substantially perpendicular to the longitudinal axis and poles of a second polarity facing an exterior surface of the magnetic cylinder;
an end cap coupled to one end of the magnetic cylinder, wherein the end cap includes one or more magnets having poles of the first polarity facing the interior cavity of the magnetic cylinder and oriented substantially parallel to the longitudinal axis and poles of the second polarity facing an exterior surface of the end cap; and
a coil assembly including at least one coil coupled to a shaft having first and second ends, wherein the coil assembly is sized to fit at least partially within the interior cavity of the magnetic cylinder via an open end of the magnetic cylinder, wherein the coil assembly is configured to move bi-directionally along the longitudinal axis with the first end of the shaft facing an interior surface of the end cap, and wherein the coil assembly is configured to receive electric current via the at least one coil in order to create a magnetic pole of the first polarity at the first end of the shaft.

2. The electric motor of claim 1 wherein the magnetic cylinder includes an inner containment ring and an outer containment ring, wherein the plurality of magnets are positioned between, and held in place by, the inner and outer containment rings.

3. The electric motor of claim 2 wherein the plurality of magnets are positioned in a radial manner in rows between the inner and outer containment rings.

4. The electric motor of claim 1 wherein the magnetic cylinder further comprises:
a first magnetic disc forming a first portion of the magnetic cylinder, the first magnetic disc including a first portion of the plurality of magnets; and
a second magnetic disc forming a second portion of the magnetic cylinder, the second magnetic disc including a second portion of the plurality of magnets.

5. The electric motor of claim 4 wherein the first and second magnetic discs include fastening features to enable the first and second magnetic discs to be coupled together.

6. The electric motor of claim 1 wherein at least a portion of the shaft is made from a material that is magnetically attracted towards the interior cavity of the magnetic cylinder.

7. The electric motor of claim 1 further comprising a connector configured to couple the coil assembly to a crankshaft assembly.

8. The electric motor of claim 7 further comprising a flywheel coupled to the crankshaft assembly.

9. The electric motor of claim 1 wherein the magnetic cylinder, end cap, and coil assembly form a single motor cylinder.

10. An electric motor comprising:
- a first magnetic disc forming a first portion of a magnetic cylinder oriented around a longitudinal axis, the first magnetic disc including a first plurality of magnets having poles of a first polarity facing an interior cavity of the magnetic cylinder and oriented substantially perpendicular to the longitudinal axis and poles of a second polarity facing an exterior surface of the magnetic cylinder;
- a second magnetic disc positioned along the longitudinal axis proximate to the first magnetic disc and forming a second portion of the magnetic cylinder, the second magnetic disc including a second plurality of magnets having poles of the first polarity facing the interior cavity of the magnetic cylinder and oriented substantially perpendicular to the longitudinal axis and poles of the second polarity facing the exterior surface of the magnetic cylinder;
- an end cap coupled to the first magnetic disc, wherein the end cap includes one or more magnets having poles of the first polarity facing the interior cavity of the magnetic cylinder and oriented substantially parallel to the longitudinal axis and poles of the second polarity facing an exterior surface of the end cap; and
- a coil assembly including at least one coil coupled to a shaft having first and second ends, wherein the coil assembly is sized to fit at least partially within the interior cavity of the magnetic cylinder with the first end of the shaft proximate to the end cap, and wherein the coil assembly is configured to receive electric current via the at least one coil in order to create a magnetic pole of the first polarity at the first end of the shaft.

11. The electric motor of claim 10 wherein the first magnetic disc includes inner and outer concentric rings, wherein the first plurality of magnets are positioned between, and held by, the inner and outer concentric rings.

12. The electric motor of claim 10 wherein at least a portion of the shaft is made from a material that is magnetically attracted towards the interior cavity of the magnetic cylinder.

13. The electric motor of claim 10 further comprising a connector configured to couple the coil assembly to a crankshaft assembly.

14. The electric motor of claim 13 further comprising a flywheel coupled to the crankshaft assembly.

15. The electric motor of claim 10 wherein the magnetic cylinder, end cap, and coil assembly form a single motor cylinder.

16. A method for use with an electric motor, the method comprising:
- providing a first plurality of magnetic forces using a magnetic cylinder centered around a longitudinal axis, the magnetic cylinder including a plurality of magnets having poles of a first polarity facing an interior cavity of the magnetic cylinder and oriented substantially perpendicular to the longitudinal axis and poles of a second polarity facing an exterior surface of the magnetic cylinder, wherein the first plurality of magnetic forces travels from the poles of the first polarity, around an open end of the magnetic cylinder, and back to the poles of the second polarity;
- providing a second plurality of magnetic forces using an end cap coupled to the magnetic cylinder, wherein the end cap includes one or more magnets having poles of the first polarity facing the interior cavity of the magnetic cylinder and oriented substantially parallel to the longitudinal axis and poles of the second polarity facing an exterior surface of the end cap, wherein the second plurality of magnetic forces travels from the poles of the first polarity, around the open end of the magnetic cylinder, and to back the poles of the second polarity; and
- generating a third plurality of magnetic forces by electrically energizing a coil assembly that includes at least one coil coupled to a shaft having first and second ends, wherein the coil assembly is sized to fit at least partially within the interior cavity of the magnetic cylinder via an open end of the magnetic cylinder, wherein the coil assembly is configured to move bi-directionally along the longitudinal axis with the first end of the shaft facing an interior surface of the end cap, and wherein the third plurality of magnetic forces creates a magnetic pole of the first polarity at the first end of the shaft.

17. The method of claim 16 further comprising inserting at least a portion of the coil assembly into the interior cavity of the magnetic cylinder before energizing the coil assembly.

18. The method of claim 16 further comprising continuing to energize the coil assembly as the shaft exits the interior cavity with sufficient electrical current to repel the coil assembly from the interior cavity.

19. The method of claim 16 further comprising ceasing to energize the coil assembly as the shaft exits the interior cavity.

20. The method of claim 16 wherein the coil assembly is energized with an amount of electrical current needed to magnetically neutralize the coil assembly relative to the interior of the magnetic cylinder.

* * * * *